United States Patent
Dal Canale

(10) Patent No.: US 11,739,582 B2
(45) Date of Patent: Aug. 29, 2023

(54) CONFINEMENT CABIN FOR WORKING OPERATIVE AREAS

(71) Applicant: FARO S.r.l., Santa Maria di Sala (IT)

(72) Inventor: Lorenzo Dal Canale, Santa Maria di Sala (IT)

(73) Assignee: FARO S.R.L., Santa Maria di Sala (IT)

( * ) Notice: Subject to any disclaimer, the term of this patent is extended or adjusted under 35 U.S.C. 154(b) by 262 days.

(21) Appl. No.: 17/129,214

(22) Filed: Dec. 21, 2020

(65) Prior Publication Data

US 2021/0189784 A1    Jun. 24, 2021

(51) Int. Cl.

| | |
|---|---|
| *E05F 15/619* | (2015.01) |
| *E05F 15/605* | (2015.01) |
| *B23Q 11/08* | (2006.01) |
| *F16P 1/02* | (2006.01) |

(52) U.S. Cl.
CPC ........ *E05F 15/619* (2015.01); *B23Q 11/0891* (2013.01); *E05F 15/605* (2015.01); *F16P 1/02* (2013.01); *E05Y 2201/62* (2013.01); *E05Y 2201/648* (2013.01); *E05Y 2201/652* (2013.01); *E05Y 2201/724* (2013.01)

(58) Field of Classification Search
CPC .................... E05Y 2201/648; E05Y 2201/724
See application file for complete search history.

(56) References Cited

U.S. PATENT DOCUMENTS

| | | | |
|---|---|---|---|
| 2,230,783 A | | 2/1941 | Parsons et al. |
| 3,318,047 A | * | 5/1967 | Carson ...................... E06B 3/50 49/155 |
| 8,819,993 B1 | * | 9/2014 | Chen ...................... E05D 15/26 160/195 |
| 2007/0068080 A1 | | 3/2007 | Vigdorovich et al. |

(Continued)

FOREIGN PATENT DOCUMENTS

| | | |
|---|---|---|
| GA | 2584446 A1 | 10/2007 |
| GB | 2398596 A | 8/2004 |

(Continued)

OTHER PUBLICATIONS

Italian Search Report and Written Opinion for IT Patent Application No. 201900025375, dated Sep. 9, 2020, 7 pages.

*Primary Examiner* — Vicky A Johnson
(74) *Attorney, Agent, or Firm* — Armstrong Teasdale LLP

(57) ABSTRACT

A confinement cabin has a load-bearing structure, confinement walls connected to the load-bearing structure to delimit an inner space of the cabin, an access opening to the inner space, and a door connected to the load-bearing structure to close the access opening. The door is movable in opening and closing with a pivoting-tilting movement and has a movable arm which at a first end is rotationally connected to the load-bearing structure to rotate around a hinging axis, and a closing panel rotationally connected to a second end of the movable arm to rotate around a tilting axis. Rotation of the panel around the tilting axis is synchronized with rotation of the movable arm around the hinging axis by an (Continued)

elastic transmission system between a first pulley coaxial to the hinging axis and a second pulley coaxial to the tilting axis. Rotation of the panel around the tilting axis is in the opposite direction to rotation of the movable arm around the hinging axis.

21 Claims, 18 Drawing Sheets

(56) References Cited

U.S. PATENT DOCUMENTS

| | | | |
|---|---|---|---|
| 2010/0107499 A1* | 5/2010 | Kuhnmuench | E05D 15/48 49/260 |
| 2014/0083013 A1* | 3/2014 | Nicholson | E05D 15/58 49/177 |

FOREIGN PATENT DOCUMENTS

| | | |
|---|---|---|
| IT | MO20110064 A1 | 9/2012 |
| WO | 0111173 A1 | 2/2001 |

* cited by examiner

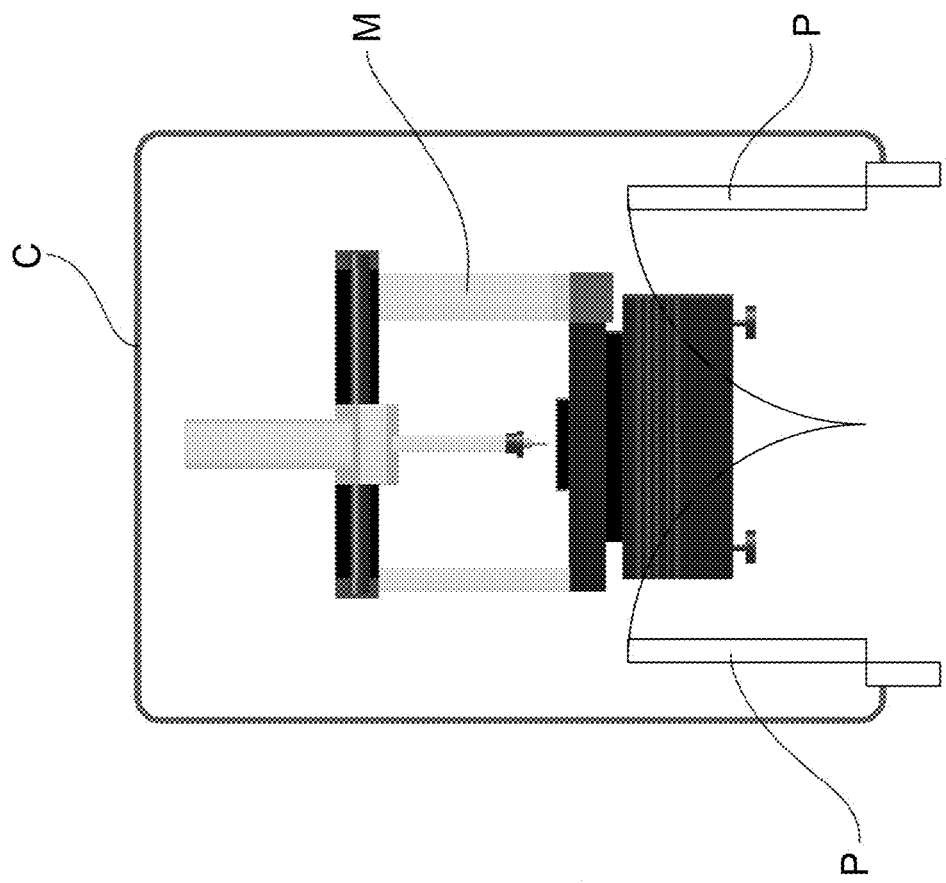
FIG.2 - Prior Art
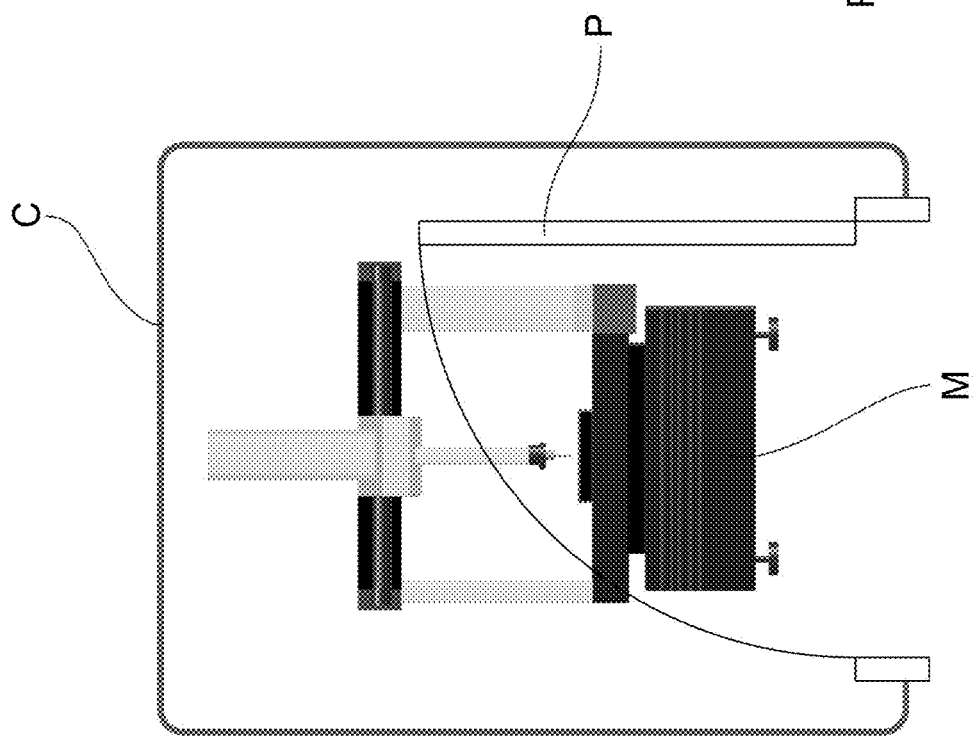
FIG.1 - Prior Art

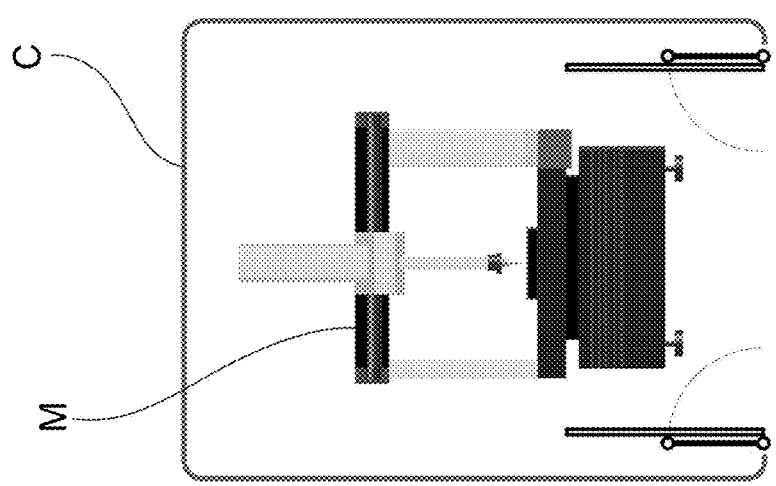
FIG.3c - Prior Art
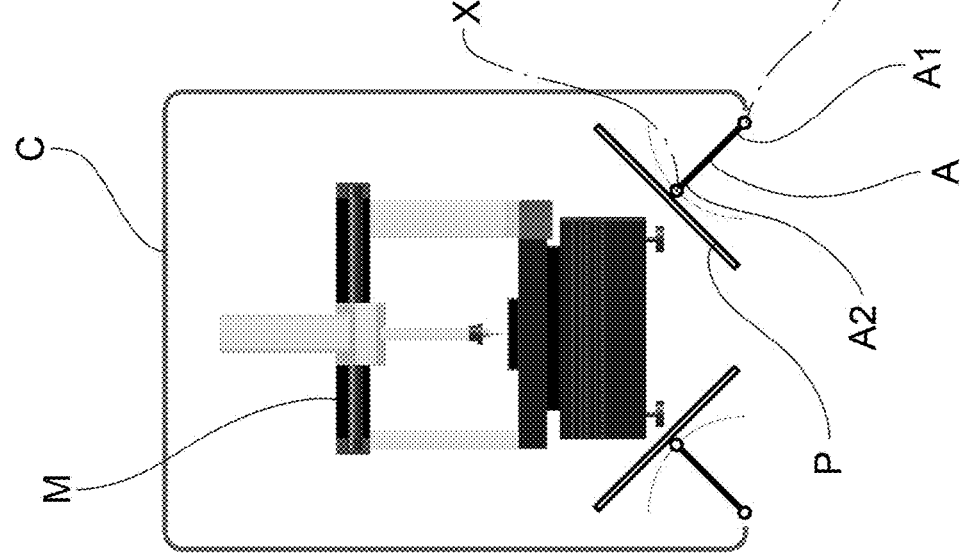
FIG.3b - Prior Art
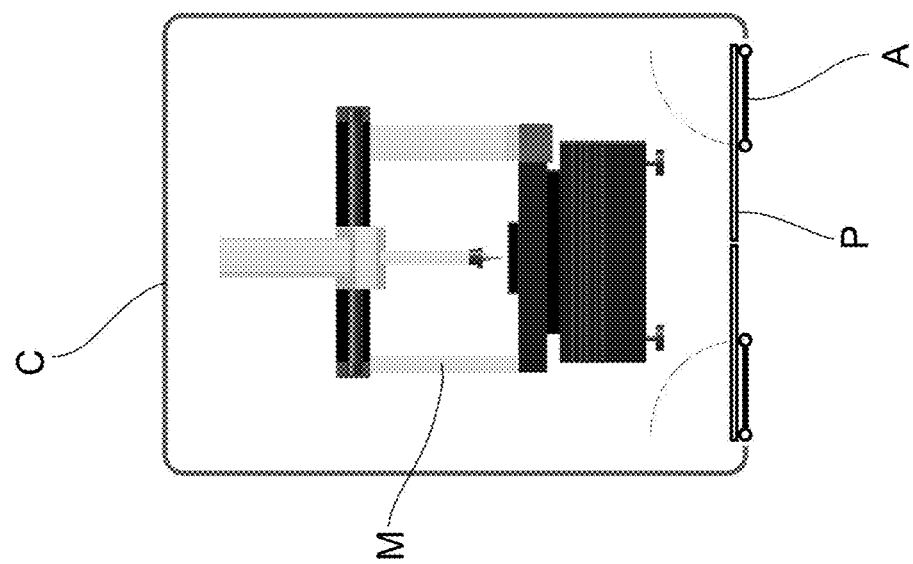
FIG.3a - Prior Art

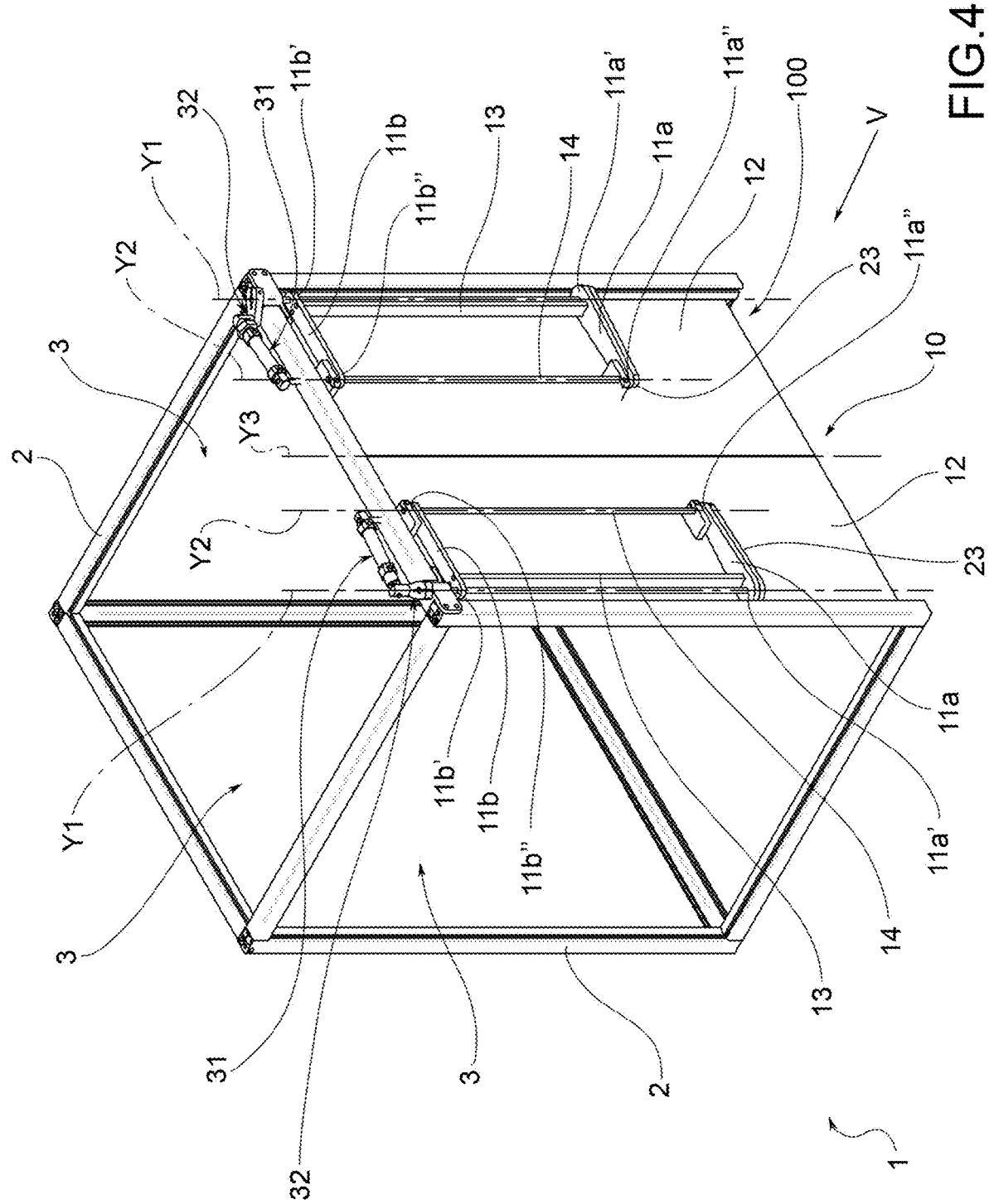

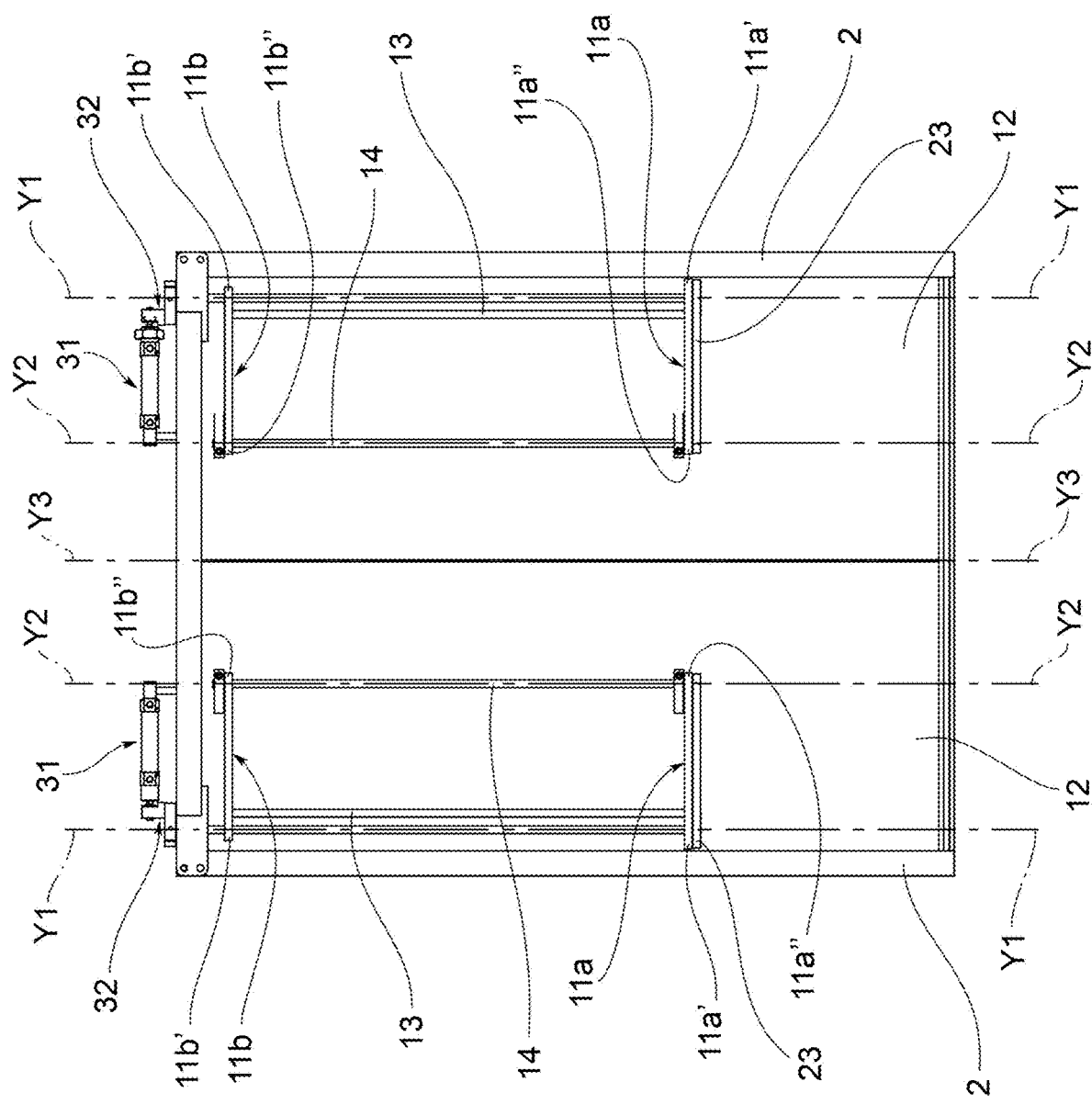

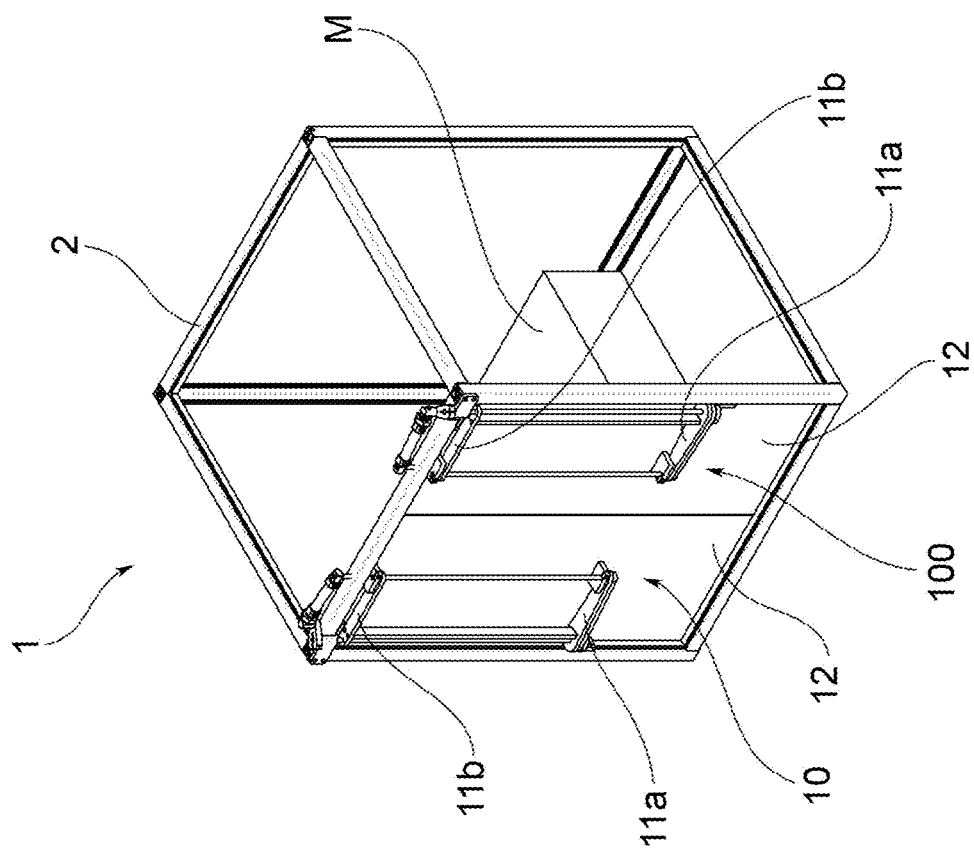
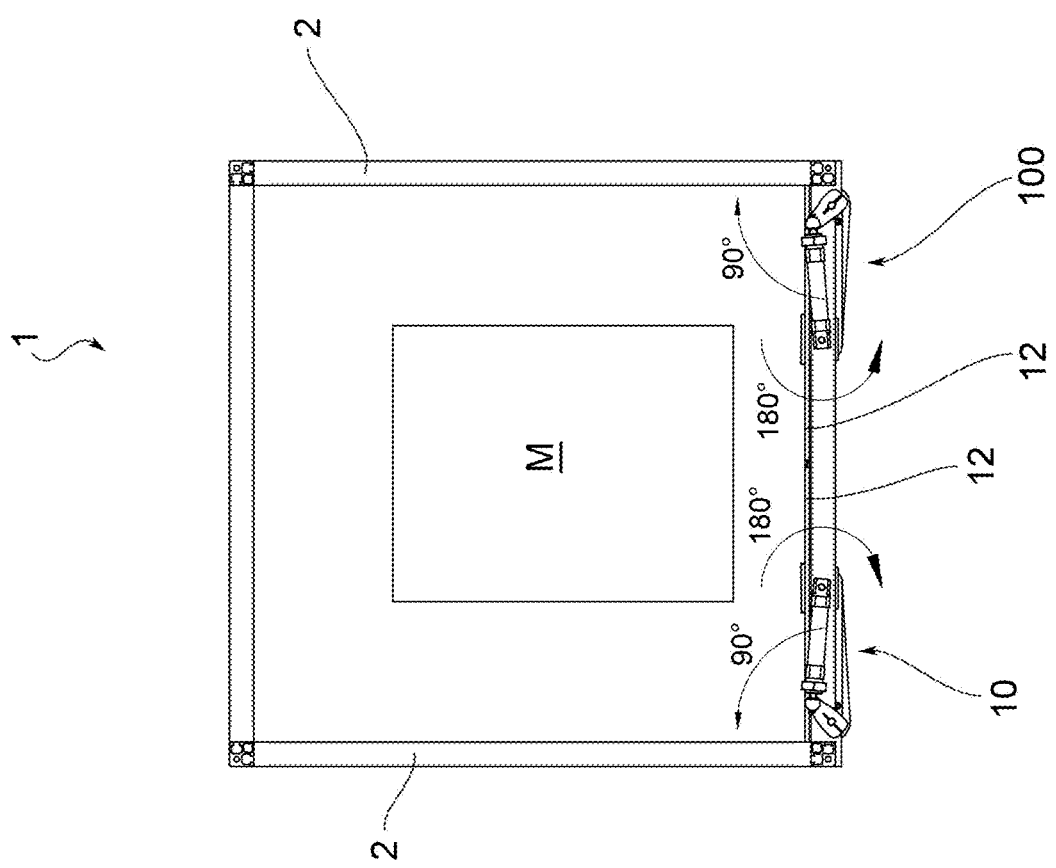

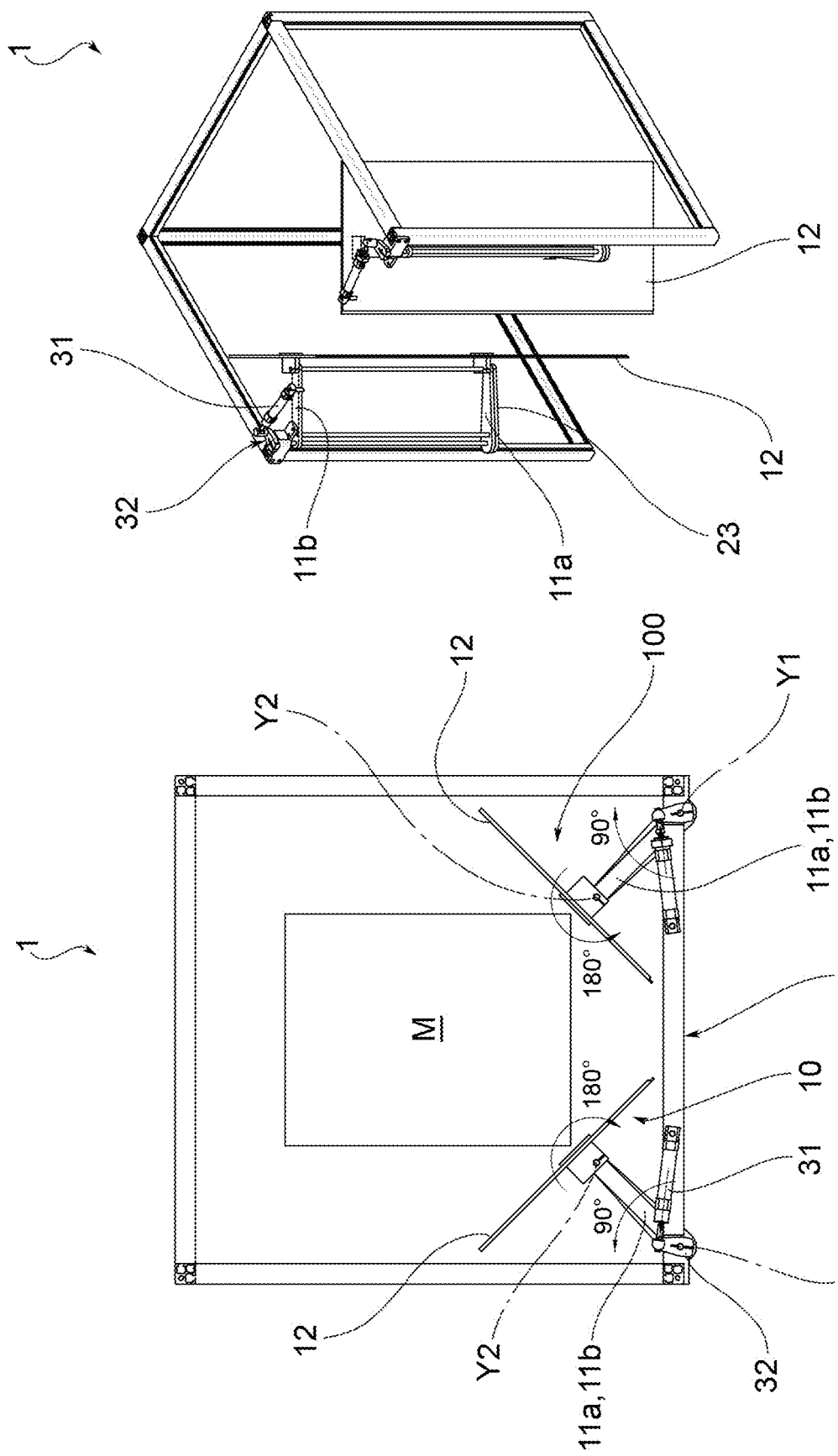

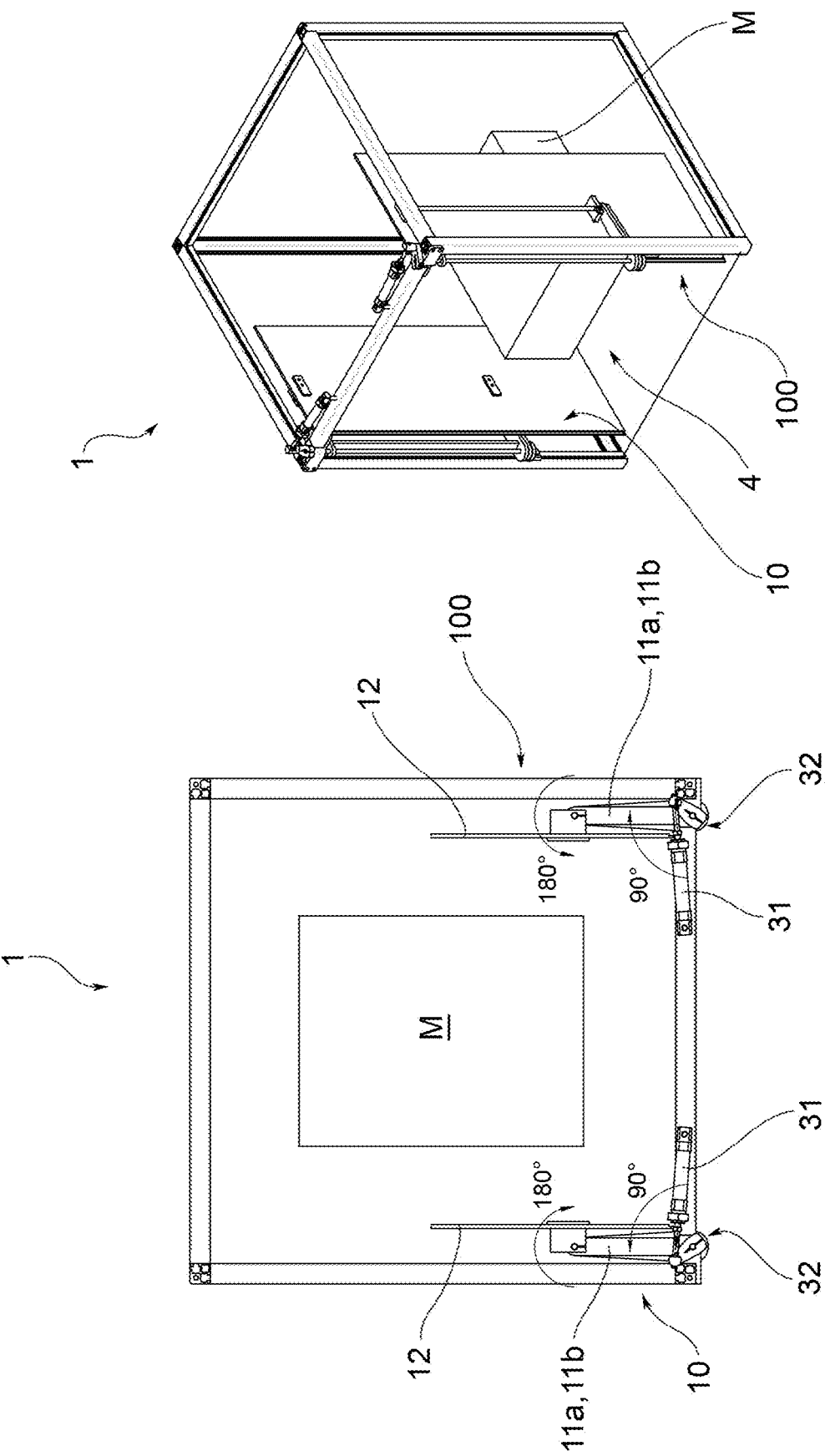

CONFINEMENT CABIN FOR WORKING OPERATIVE AREAS

CROSS-REFERENCE TO RELATED APPLICATION

This application claims priority to and benefit of Italian Patent Application No. 102019000025375 filed Dec. 23, 2019, the contents of which are incorporated by reference in their entirety.

FIELD OF THE INVENTION

The present invention relates to a confinement cabin for working operative areas.

In particular, the confinement cabin according to the present invention can be used to separate from the surrounding environment a working operative area of one or more machine tools, such as lathes, presses, cutting systems, or of a robot or of work centers for chemical treatments, painting, sandblasting, welding, and washing. Moreover, the confinement cabin according to the present invention can be used to isolate devices for additive manufacturing. In addition, the confinement cabin according to the present invention can also be used to separate from the surrounding environment a working operative area consisting of an area not to be contaminated, such as a sterile area, or consisting of a contaminating area or a pressurized area. In particular, the confinement cabin according to the present invention can be used as a sterilization cabinet. The confinement cabin according to the present invention is therefore suitable for use not only in production facilities, but also in research laboratories, in particular biochemical laboratories.

BACKGROUND OF THE INVENTION

In general, a confinement cabin for working operative areas comprises a plurality of fixed walls, which are arranged around the working operative area to separate it from the surrounding environment. To allow access to the operative area, for example for maintenance or cleaning operations of machinery arranged inside or for removal and insertion of processed products, the cabin is equipped with at least one access opening provided with a movable cover element, which acts as a door.

The aforesaid movable cover may be a lift door, i.e., with a vertical opening and closing movement. For safety reasons, however, this type of door must be provided with complex safety systems, to the disadvantage of cost-effectiveness of installation, management and maintenance.

Generally, for reasons of constructional simplicity, single or double hinged doors with opening towards the inside are adopted. As diagrammatically shown in FIGS. 1 and 2 respectively (where M indicates a machine installed in the operative area, C the confinement cabin and P the access door(s)), the hinged door solution has, however, space limits and can therefore only be used in the presence of a large free space in the area in front of the access opening.

In cases where, for reasons of ergonomics and/or reduction of the dimensions of the cabins, there is not sufficient space in front of the access opening, sliding doors are used. However, this solution requires availability of space to the sides of the access opening to ensure the door has freedom to slide.

Furthermore, with respect to a hinged door, the sliding door requires sliding guides. This exposes the door to the risk of jams due to obstructions of the guide by machining residues, such as shavings, dust, scraps or lubricating liquids-coolants.

As an alternative to sliding doors, pivoting-tilting doors may be adopted which, with equal dimensions, allow the door to be moved in significantly smaller spaces than a hinged door.

More in detail, as diagrammatically shown in the sequence of FIGS. 3a-c, a pivoting-tilting door comprises a closing panel P connected to a load-bearing structure C (in this case the fixed walls of the cabin) by at least one movable support arm A. The movable support arm A is rotationally connected to the load-bearing structure C at a first end A1 thereof to rotate around a first vertical axis X1. In turn, the closing panel P is rotationally connected to the movable arm A at a second end A2 of the latter so as to be able to tilt with respect to the arm itself around a second vertical axis X2, parallel to the first. The tilting movement of the panel with respect to the arm is not free, but is guided by the sliding of a pin (integral with the base or the top of the door) inside a guide obtained at the floor or ceiling of the cabin. Said guide is profiled so that the panel, driven in rotation by the movable arm (for example motorized) and constrained by the pin to follow the profile of the guide, is forced to tilt with respect to the movable arm in motion, with a counter rotation around the second vertical axis X2. The composition of the two movements reduces the maneuvering space required for opening and closing the panel P around the first vertical axis X1.

While allowing opening/closing in much smaller spaces than hinged doors, pivoting-tilting doors nevertheless have the same limitation as sliding doors, as they require sliding guides as well. They are therefore also exposed to the risk of jamming connected to obstructions of the guide by machining residues, such as shavings, dusts, scraps or lubricating liquids-coolants.

To date, however, there are no confinement cabins provided with closing doors, which require limited maneuvering space in opening and closing and at the same time are not subject to the limits associated with the presence of sliding guides.

SUMMARY OF THE INVENTION

It is an object of the present invention to provide a confinement cabin for working operative areas, provided with closing doors which require limited maneuvering space in opening and closing and at the same time are not subject to the limits associated with the presence of sliding guides.

It is a further object of the present invention to provide a confinement cabin for working operative areas which is also simple and economical to produce.

BRIEF DESCRIPTION OF THE DRAWINGS

The technical features of the invention according to the aforesaid objects may be clearly found in the contents of the claims hereinbelow and advantages thereof will become more apparent from the following detailed description, made with reference to the accompanying drawings which show one or more embodiments merely given by way of non-limiting example, in which:

FIGS. 1 and 2 show two diagrammatic views of a confinement cabin for working operative areas of traditional type, provided with a single-leaf and two-leaf hinged door;

FIGS. 3a-c show in sequence the diagrammatic operation of two pivoting-tilting doors with sliding guides on the ground in a confinement cabin for working operative areas of traditional type;

FIG. 4 shows a perspective view from above of a confinement cabin for working operative areas according to a first preferred embodiment of the present invention;

FIG. 5 is a front orthogonal view of the cabin of FIG. 4, according to the arrow V indicated therein;

FIGS. 8 and 8a show the cabin of FIG. 4 illustrated with the two doors in the closed position respectively with a perspective view from above and an orthogonal view from above;

FIGS. 9 and 9a show the cabin of FIG. 4 illustrated with the two doors in an intermediate position between closing and opening respectively with a perspective view from above and an orthogonal view from above;

FIGS. 10 and 10a show the cabin of FIG. 4 illustrated with the two doors in the open position respectively with a perspective view from above and an orthogonal view from above;

FIGS. 11, 12 and 13 show with three orthogonal views from below the sequence of opening movements of one of the two cabin doors illustrated respectively in FIGS. 8a, 9a and 10a;

FIGS. 24, 25 and 26 show with three orthogonal views from below the sequence of opening movements of one of the two cabin doors illustrated respectively in FIGS. 21a, 22a and 23a;

DETAILED DESCRIPTION

It is the object of the present invention a confinement cabin for working operative areas.

In particular, the confinement cabin according to the present invention can be used to separate from the surrounding a working operative area of one or more machine tools environment, such as lathes, presses, cutting systems, or of a robot or of work centers for chemical treatments, painting, sandblasting, welding, and washing. Moreover, the confinement cabin according to the present invention can be used to isolate devices for additive manufacturing. In addition, the confinement cabin according to the present invention can also be used to separate from the surrounding environment a working operative area consisting of an area not to be contaminated, such as a sterile area, or consisting of a contaminating area or a pressurized area. In particular, the confinement cabin according to the present invention can be used as a sterilization cabinet.

Therefore, the confinement cabin according to the present invention is suitable for being used not only in production facilities, but also in research laboratories, in particular biochemical laboratories.

The confinement cabin according to the present invention has been indicated as a whole with 1 in the accompanying drawings.

Here and in the following detailed description and claims, reference will be made to the confinement cabin 1 in the use condition, i.e., in particular resting on the ground, for example on the floor of a building. Therefore, any reference to lower or upper, front or rear, horizontal or vertical positions or sides, must be understood in this sense.

According to a general embodiment of the present invention, the confinement cabin 1 comprises:

a load-bearing structure 2;

one or more confinement walls 3 connected to the load-bearing structure 2 to at least partially delimit an inner space of the cabin 1;

an access opening 4 to the aforesaid inner space.

Figure 17:
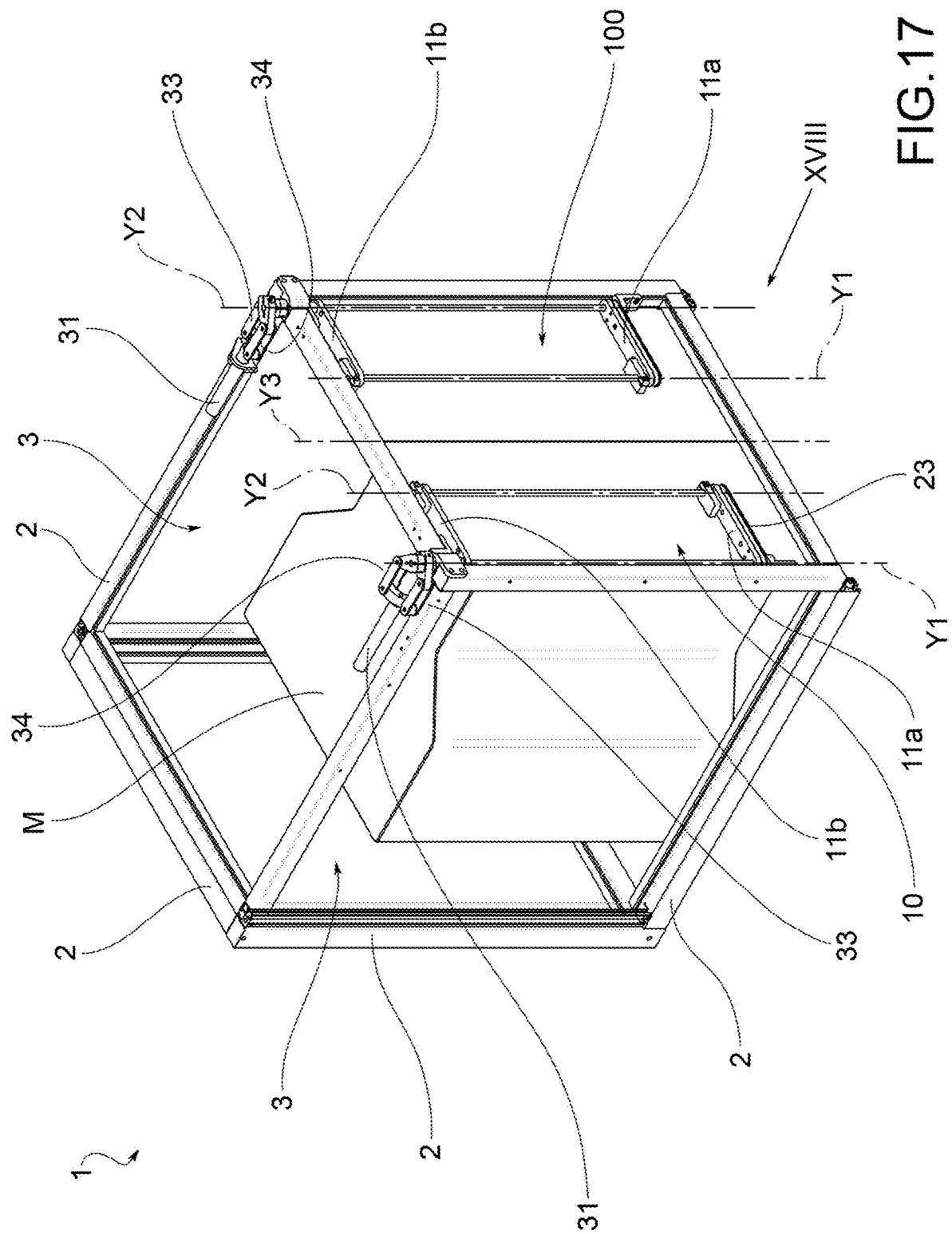
FIG. 17 shows a perspective view from above of a confinement cabin for working operative areas according to a second preferred embodiment of the present invention.
Figure 18:
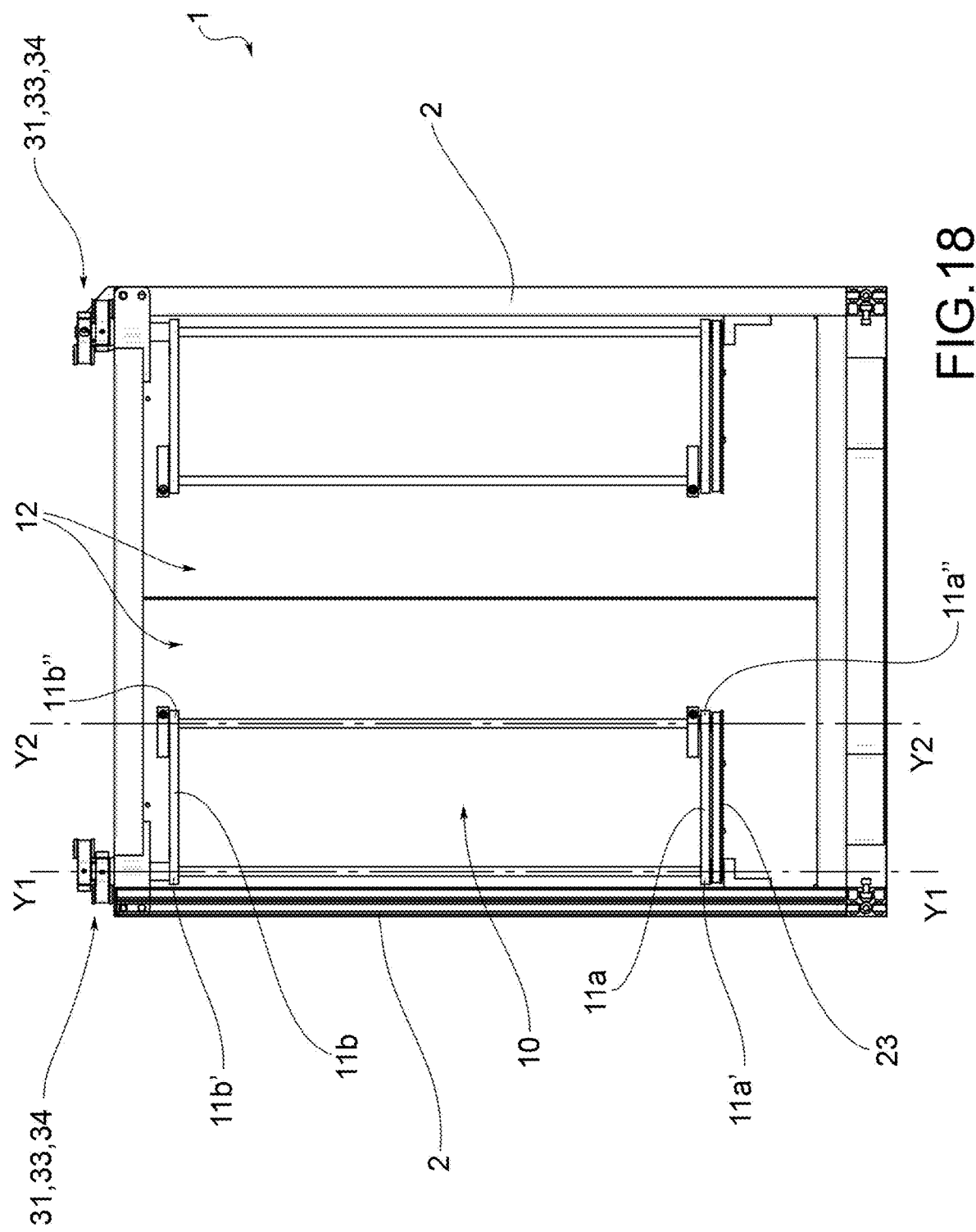
FIG. 18 is a front orthogonal view of the cabin of FIG. 17, according to the arrow XVIII indicated therein.
Figure 19:
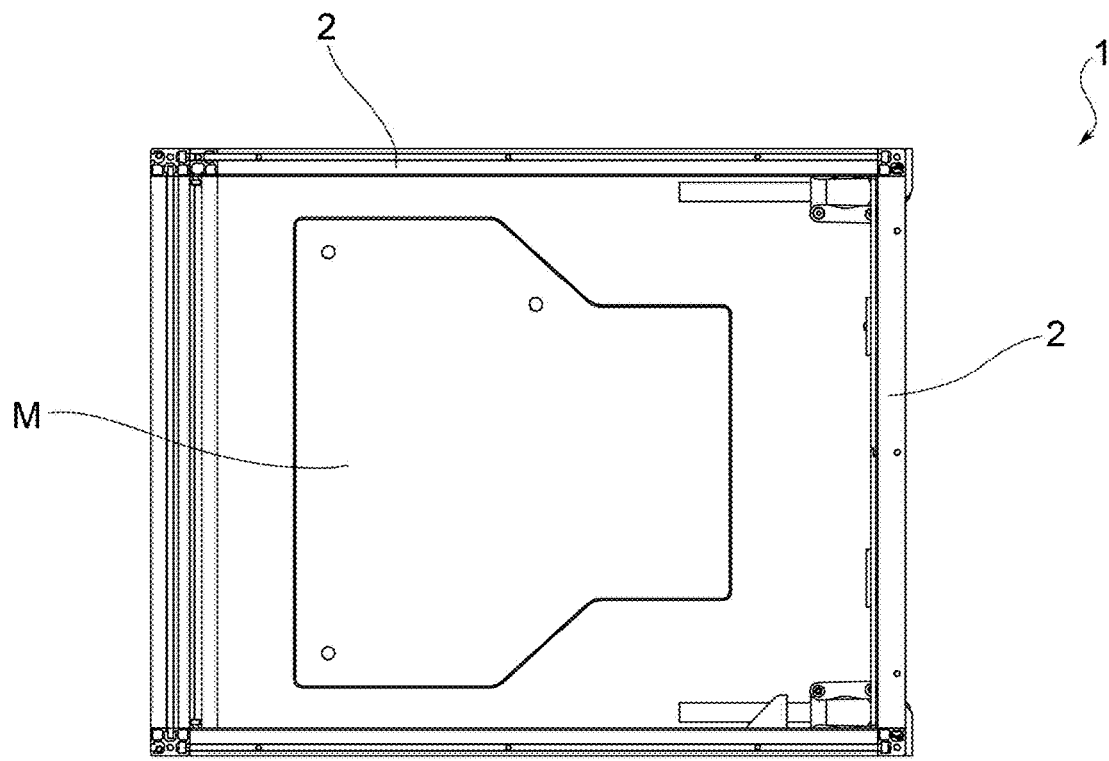
FIGS. 19 and 20 show two orthogonal views respectively from below and from above of the cabin of FIG. 17.
Figure 20:
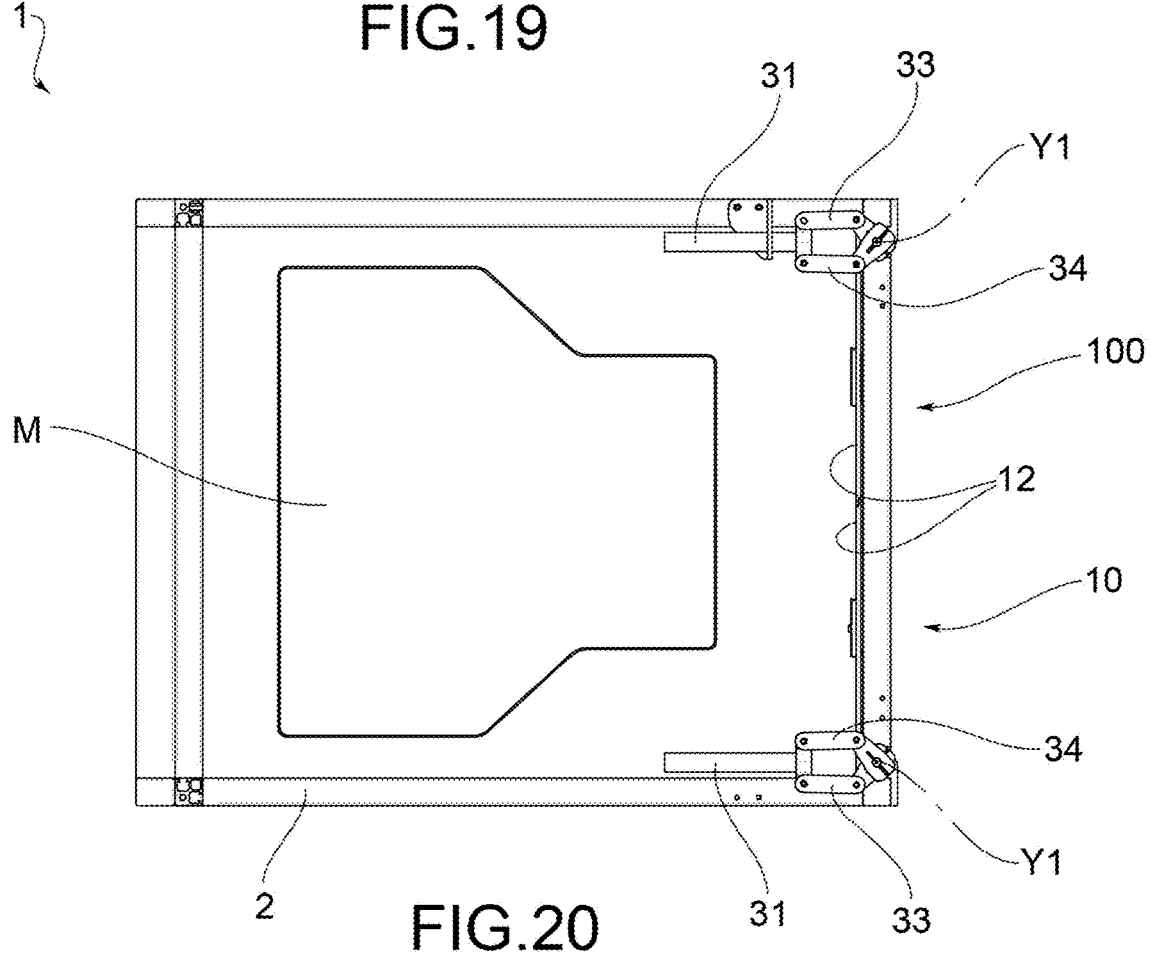
Figure 21:
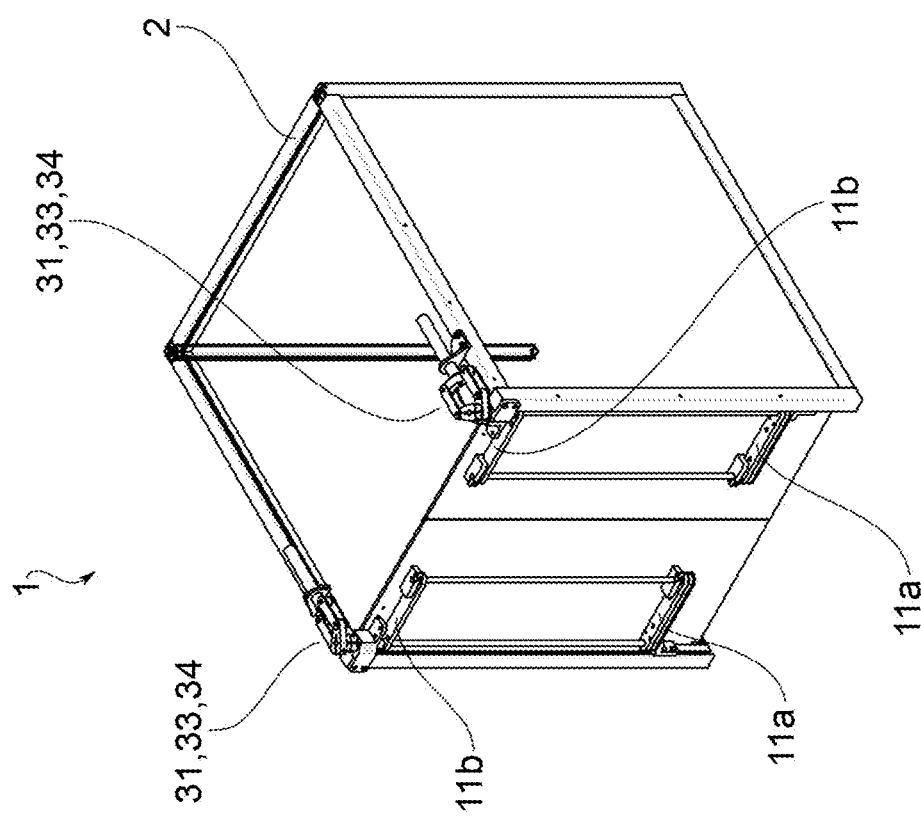
FIGS. 21 and 21a show the cabin of FIG. 17 illustrated with the two doors in the closed position respectively with a perspective view from above and an orthogonal view from above.
Figure 21A:
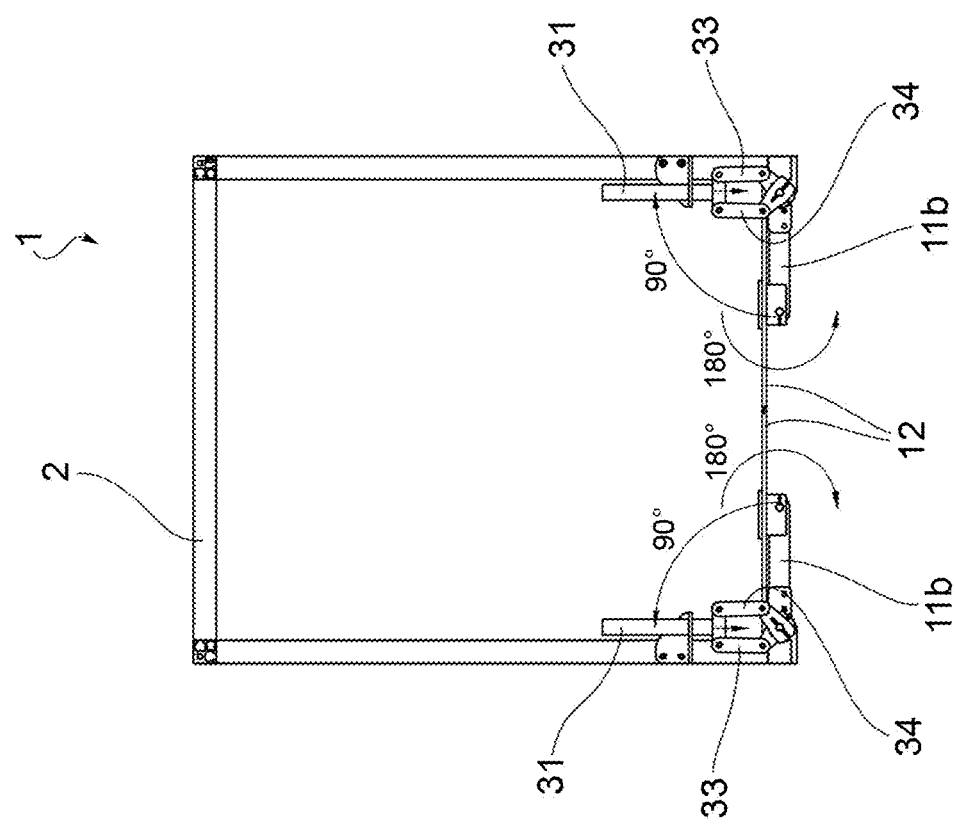
Figure 22:
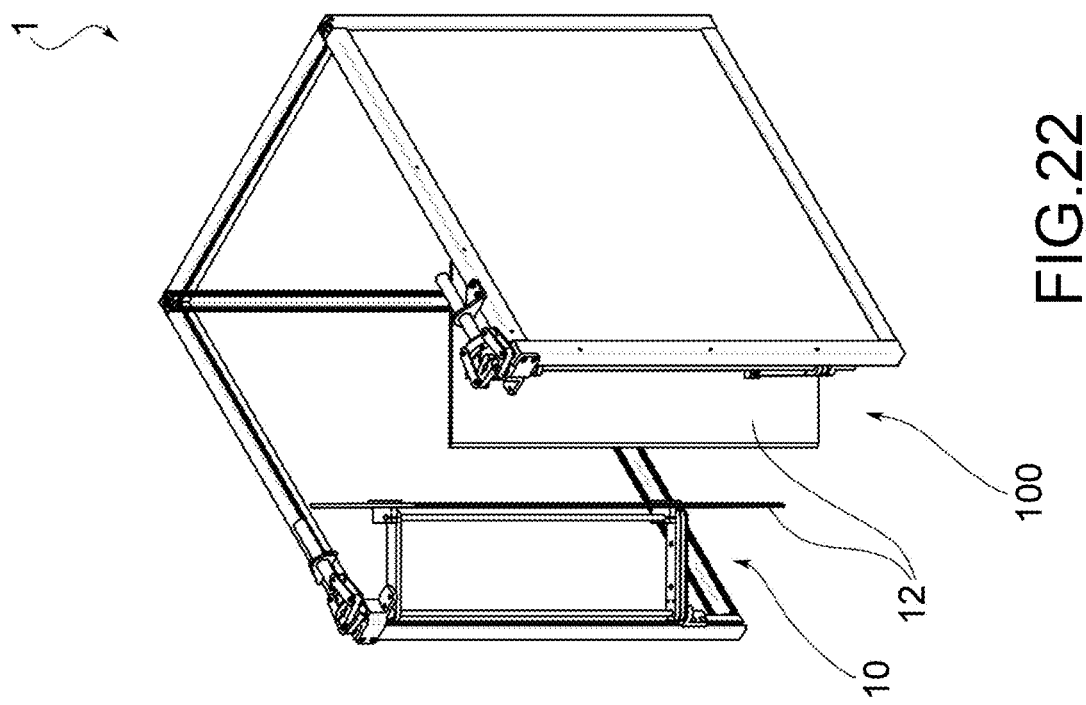
FIGS. 22 and 22a show the cabin of FIG. 17 illustrated with the two doors in an intermediate position between closing and opening respectively with a perspective view from above and an orthogonal view from above.
Figure 22A:
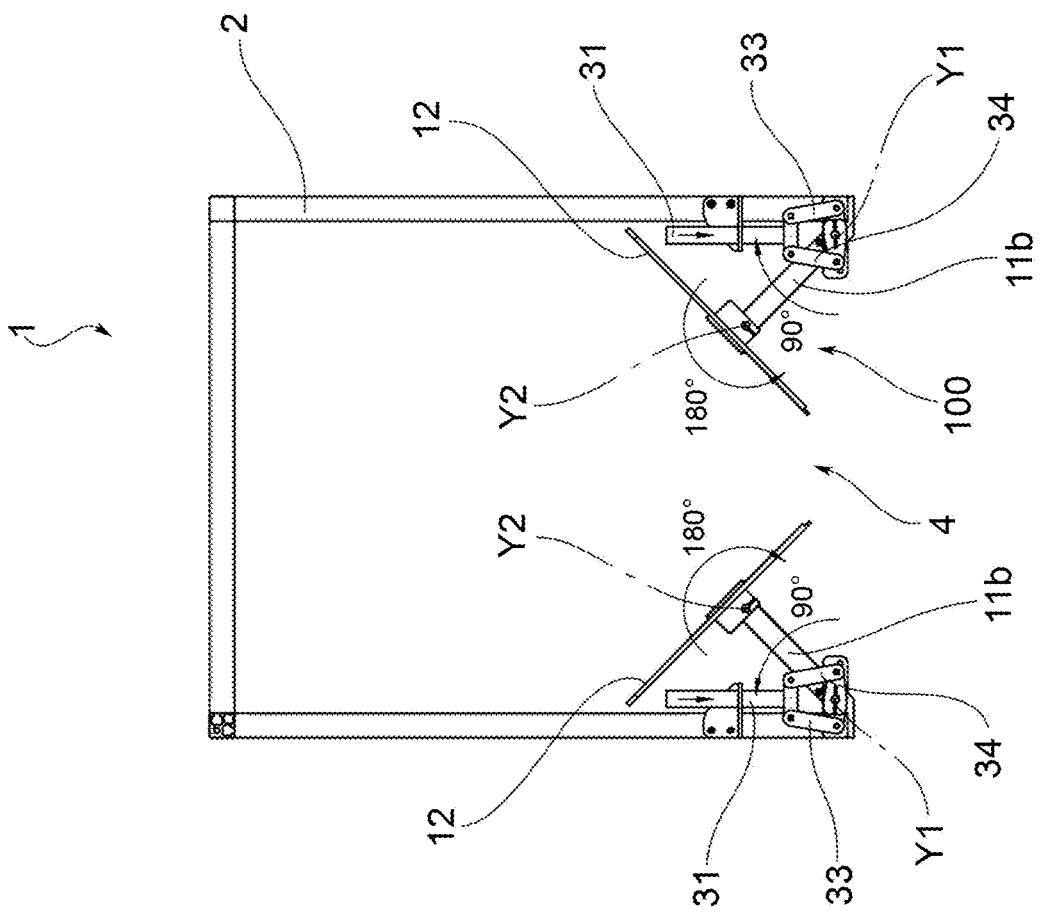

The working operative area to be separated from the surrounding environment is obtained in the inner space of the cabin 1. As illustrated in FIGS. 8-10 or in FIG. 17, a machine tool may be installed in the working operative area delimited by the cabin 1, diagrammatically represented in some figures with a parallelepiped M.

The load-bearing structure 2 may be of any type. In particular, it can consist of a frame. The confinement walls may be made of any material as long as it is suitable for the purpose. In particular, the walls may be made of transparent materials, such as polyethylene glycol (PETG), polycarbonate (PC), methacrylate (PMMA, commercially known as plexiglass), and tempered glass. Preferably, the walls are made of polycarbonate.

The access opening 4 may occupy an entire wall of the cabin 1 or even just a part of a wall. In the latter case, preferably, the load-bearing structure 2 will have a portion delimiting the perimeter of the access opening 4.

The confinement cabin 1 further comprises at least one door 10, 100 connected to the aforesaid load-bearing structure 2 to close the access opening 4.

As illustrated in the accompanying Figures, the aforesaid at least one door 10, 100 can be moved in opening and closing with a pivoting-tilting movement.

More in detail, the aforesaid at least one door 10, 100 comprises:

at least one movable support arm 11a, 11b which at a first end 11a', 11b' thereof is rotationally connected to the aforesaid load-bearing structure 2 to rotate around a hinging axis Y1; and a closing panel 12 rotationally connected to a second end 11a", 11b" of said movable support arm 11a, 11b to rotate around a tilting axis Y2 parallel to the hinging axis Y1.

Preferably, the hinging axis Y1 and the tilting axis Y2 are vertical.

Operatively, the opening and closing movements of the door 10, 100 with respect to the access opening 4 are a composition of:

a rotational motion around the hinging axis Y1 imposed by the movable arm on the panel 12 with respect to the load-bearing structure 2; and a rotational motion of the panel 12 around the tilting axis Y2 with respect to the second end 11a", 11b" of said movable support arm 11a, 11b.

According to the present invention, the rotation of the panel 12 around the tilting axis Y2 is synchronized with the rotation of said at least one movable arm 11a, 11b around the hinging axis Y1 through an elastic transmission system 23 between a first pulley 21 coaxial to the hinging axis Y1 and a second pulley 22 coaxial to the tilting axis Y2 and integral with the panel 12.

Still according to the present invention, the aforesaid transmission system is configured so that the rotation of the panel around the tilting axis Y2 is in the opposite direction to the rotation of said at least one movable arm 11a, 11b around the hinging axis Y1.

Due to the present invention, control of the tilting movement of the panel with respect to the movable arm is no longer entrusted to a sliding guide suitable to constrain the motion of the panel dragged by the movable arm along a predefined path. Therefore, the pivoting-tilting door 10, 100 according to the present invention no longer requires a sliding guide on the ground and/or ceiling in order to function.

Therefore, the confinement cabin for working operative areas according to the present invention is provided with closing doors which require limited maneuvering space in opening and closing and at the same time are not subject to the limits associated with the presence of sliding guides.

Preferably, as shown in the accompanying Figures, the cabin 1 comprises two doors 10, 100 which cooperate to close said opening 4 and are connected to the load-bearing structure 2 with the respective hinging axes Y1 arranged in opposite positions with respect to a vertical, center-line axis Y3 of the opening 4. This solution is preferred since, being the dimensions of the access opening equal, the maneuvering space is further reduced compared to a single door.

In accordance with embodiments not shown in the accompanying Figures, the confinement cabin 1 may comprise a single door to close the access opening 4.

Preferably, the aforesaid elastic transmission system comprises a toothed belt 23. In this case, the first pulley 21 and the second pulley 22 are both toothed pulleys.

Alternatively, the transmission system between the aforesaid two pulleys can consist of a chain, a cable or a belt as well.

As shown in particular in FIGS. 8-10 and FIGS. 21-23, the panel 12 of each door (whether single or double) is movable between:

a closed position, in which said panel 12 is placed at the opening 4 (to obstruct it completely in the case of a single door or partially, in the case of a double door); and an open position, in which the panel 12 is moved away from the opening 4.

Preferably, as shown in the accompanying Figures, in the closed position the aforesaid at least one movable arm 11a, 11b is arranged outside the inner space of the cabin 1. In other words, the movable arm 11a, 11b is connected to the panel 12 at a face of the same panel which in the closed position is facing the outside of the cabin 1. Thereby, in the closed position, the panel 12 separates the movable arm and the components kinematically connected thereto, such as the pulleys and the transmission system, from the working operative area. Therefore, the movable arm is protected and shielded from the effects of the activities taking place in the working operative area confined inside the cabin. For example, the movable arm can be protected from chips and scraps generated by a machine tool or from dispersions of lubricating liquids-coolants.

Preferably, as shown in the accompanying Figures, the pivoting-tilting door 10, 100 is configured so that in the movement between the closed position and the open position, the relative panel 12 is kept completely inside the cabin 1 without ever protruding towards the outside thereof. In other words, the panel 12 never crosses the access opening with any portion thereof. Thereby, the panel 12 can be sized to abut against the portion of the load-bearing structure delimiting the access opening 4 so as to be able to seal with a gasket.

Advantageously, the confinement cabin 1 may comprise a sealing gasket (not shown in the accompanying Figures), which is fixed to the load-bearing structure 2 along at least a part of the perimeter of the aforesaid access opening 4. In this case, the pivoting-tilting door 10, 100 is configured so that in the closed position the panel 12 abuts against the aforesaid sealing gasket. Thereby, the confinement cabin 1 provides complete shielding of the working operative area even at the door, avoiding accidental exit of shavings, scraps or lubricating liquids-coolants. Therefore, the cabin 1 provides more complete protection to operators present in the environment near the cabin.

Advantageously, this solution allows obtaining confinement cabins 1 with sealed doors, suitable to separate from the surrounding environment a working operative area consisting of an area not to be contaminated, such as a sterile area, or consisting of a contaminating area or a pressurized area.

Figure 13:
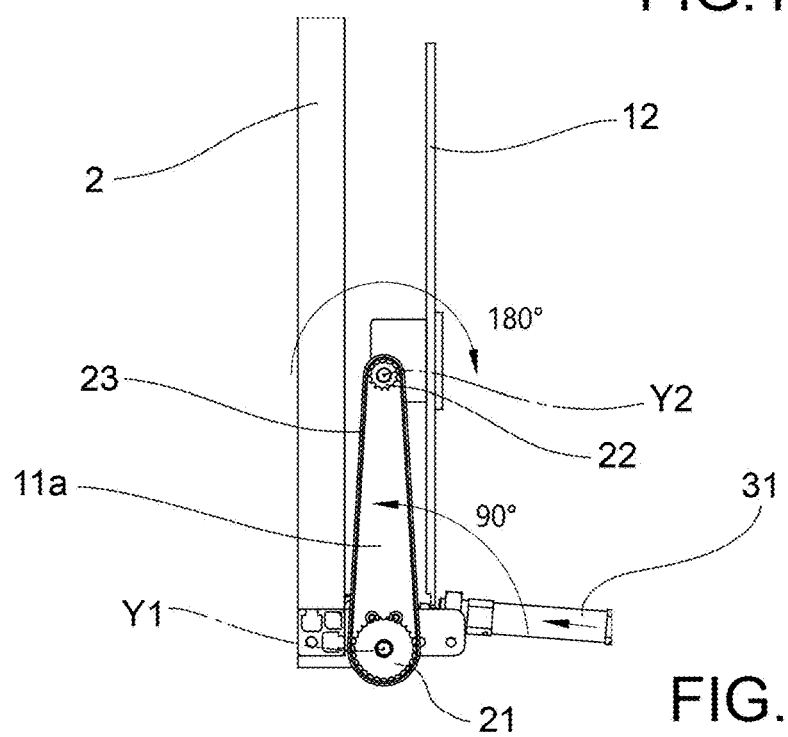
Figure 14:
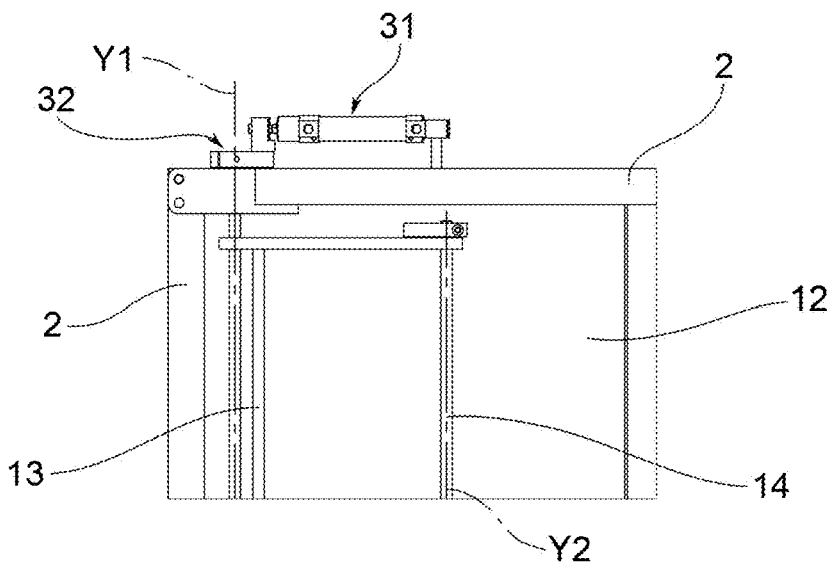
FIGS. 14, 15 and 16 show three enlarged detail views respectively of FIGS. 5, 7 and 4 related to actuation means of one of the two cabin doors.
Figure 15:
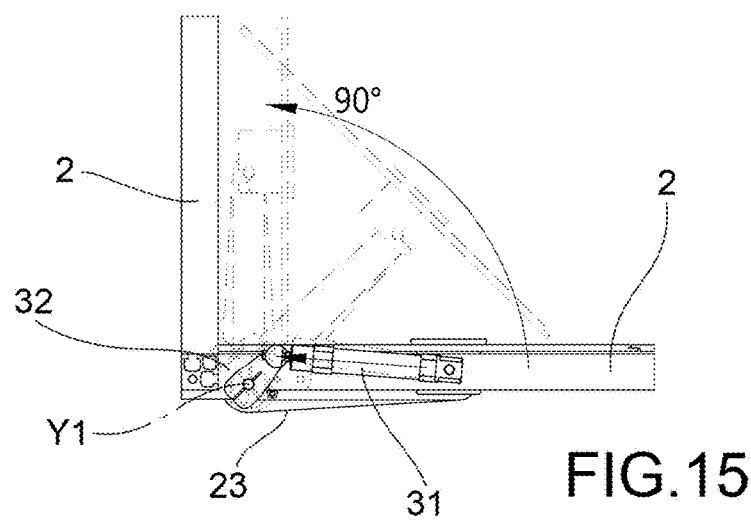
Figure 16:
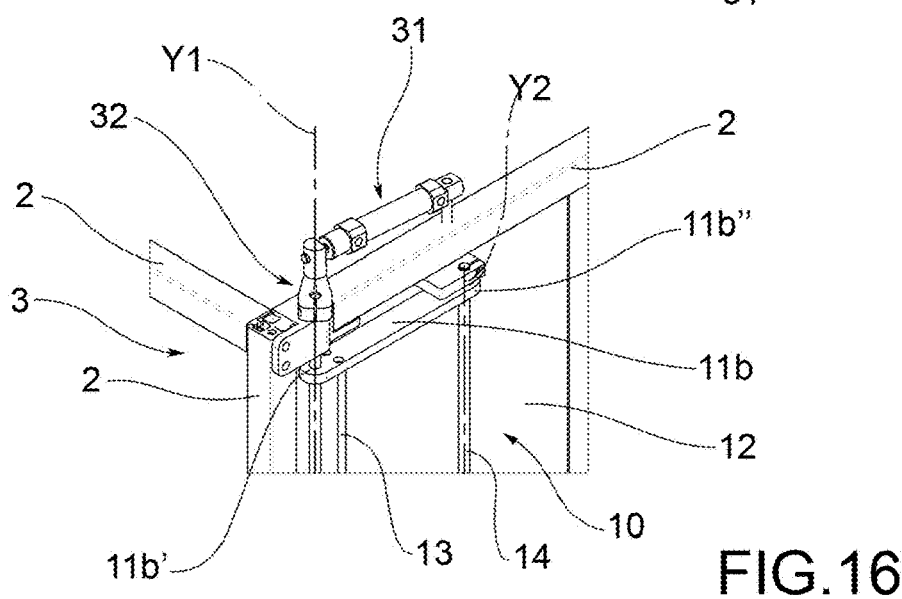
Figure 23:
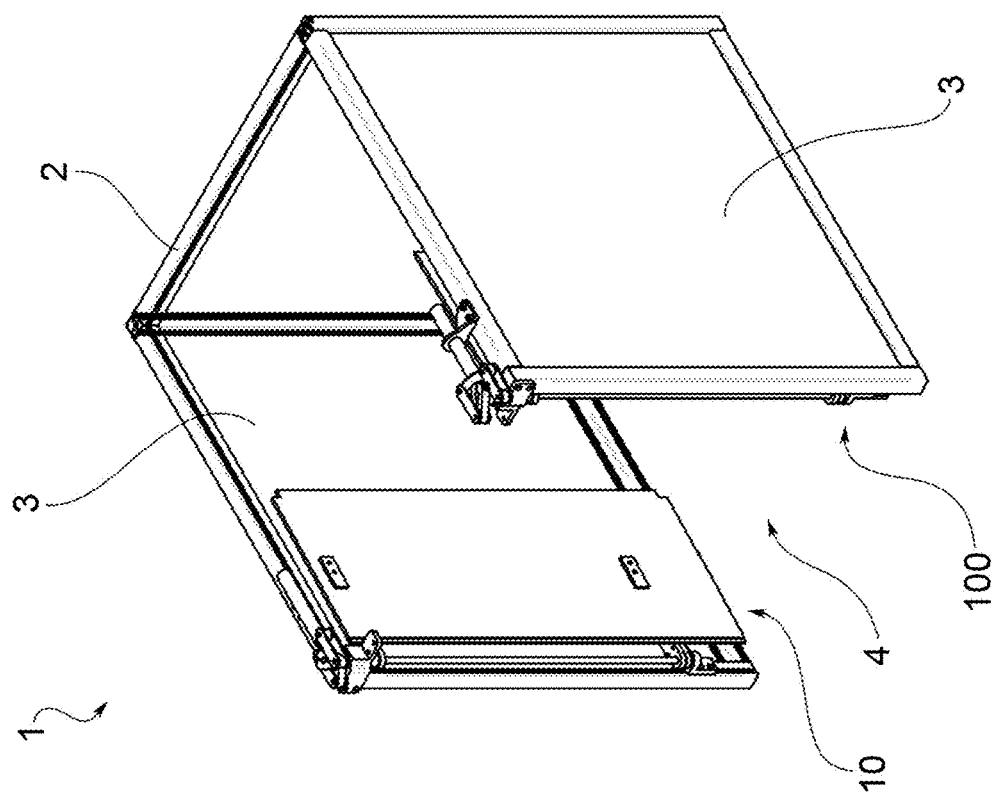
FIGS. 23 and 23a show the cabin of FIG. 17 illustrated with the two doors in the open position respectively with a perspective view from above and an orthogonal view from above.
Figure 23A:
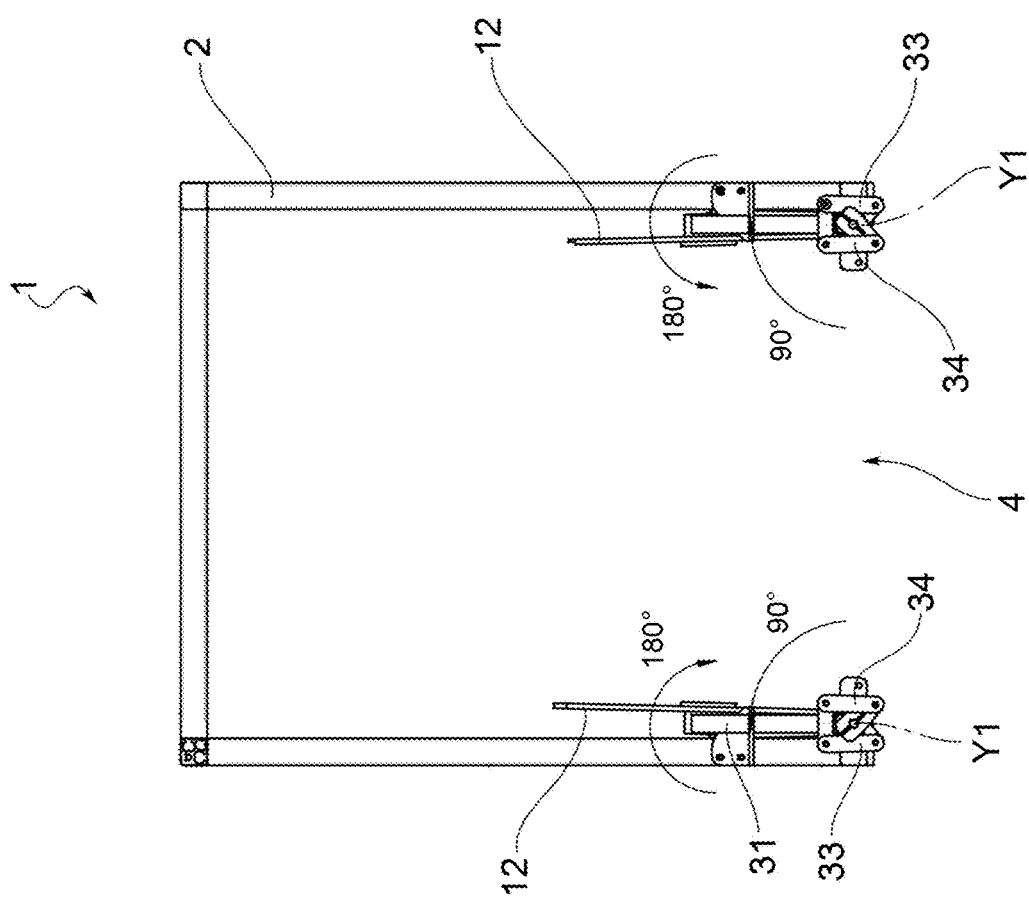
Figure 26:
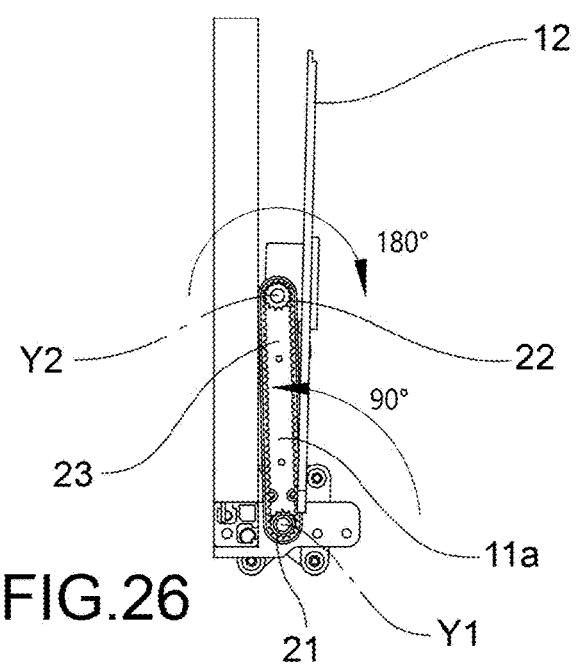
Figure 27:
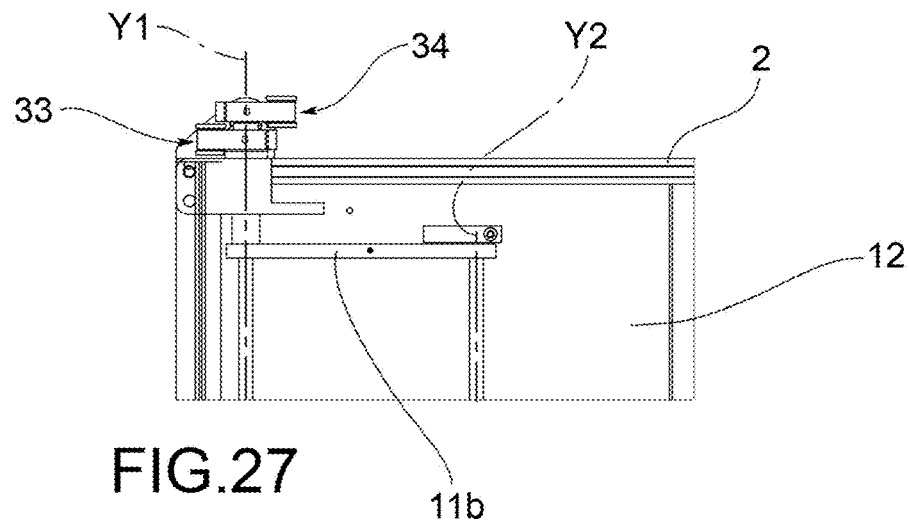
FIGS. 27, 28 and 29 show three enlarged detail views respectively of FIGS. 18, 20 and 17 related to actuation means of one of the two cabin doors.
Figure 28:
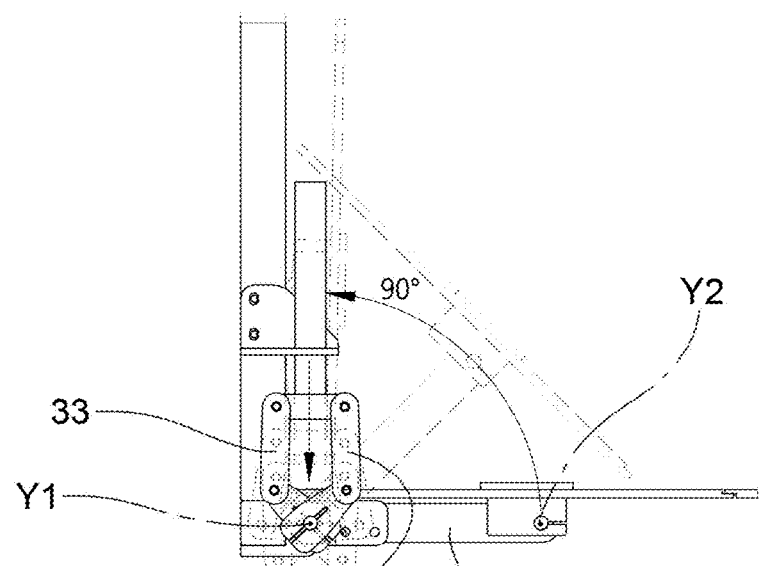
Figure 29:
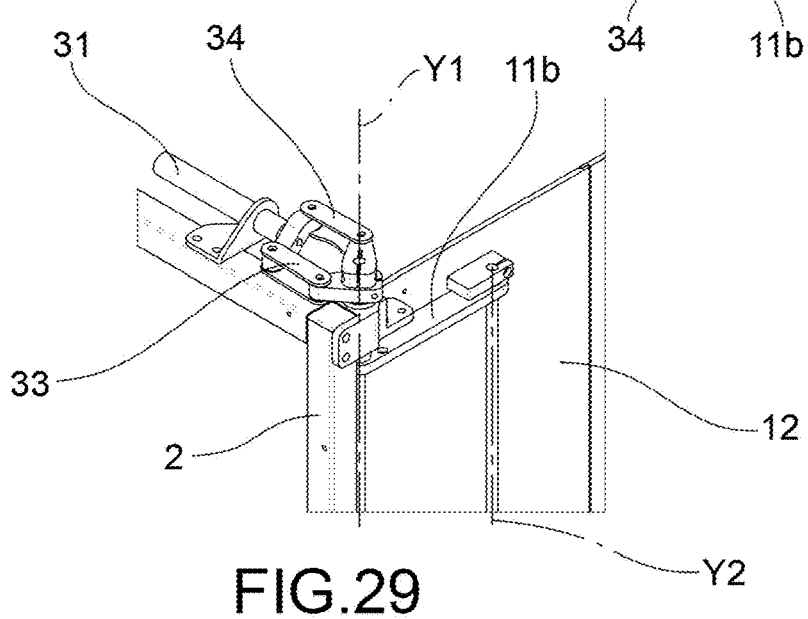

Advantageously, as shown in particular in FIGS. 10 and 13 and in FIGS. 23 and 26, the load-bearing structure 2 of the cabin 1 and the relative door 10, 100 can be configured so that in the open position the aforesaid at least one arm 11a, 11 b of the door 10, 100 is arranged between a portion of the load-bearing structure 2 and the panel 12. Thereby, even in the open position, the panel 12 can shield the movable arm and the components kinematically connected thereby, such as the pulleys and the transmission system, from the working operative area. Therefore, even in the open position, the movable arm is protected and shielded from the effects of the activities taking place in the working operative area confined inside the cabin, such as cleaning and maintenance activities. For example, the movable arm can be protected from shavings and scraps or from dispersions of lubricating liquids-coolants.

In accordance with the embodiments shown in the accompanying Figures, the aforesaid at least one door 10, 100 may comprise two movable support arms 11a, 11b, in order to provide a more mechanically stable support to the panel 12.

More in detail, the two movable support arms 11a, 11b, at different vertical heights with respect to each other, are both rotationally connected:

to the load-bearing structure 2 around the hinging axis Y1 at the respective first ends 11a', 11b' thereof; and to the panel 12 around the tilting axis Y2 at the respective second ends 11a",11b" thereof.

Advantageously, the aforesaid two movable support arms 11a, 11b can be rigidly connected to each other by a first elongated element 13 and by a second elongated element 14, which is coaxial to the tilting axis Y2 and acts as a tilting pin for the panel. 12. The two movable support arms 11a, 11b and the two elongated connecting elements 13, 14 together form a movable support frame for said panel 12.

Preferably, as shown in the accompanying Figures, the closing panel 12 can be moved by said at least one movable arm 11a, 11 b.

Alternatively, the panel 12 can be moved directly, to drag the movable arm 11a, 11 b therewith.

Preferably, the confinement cabin 1 comprises actuation means 31, 32 or 31, 33, 34 of the aforesaid at least one door 10, 100 in opening and closing. Such actuation means enable automating opening and closing of the door 10, 100.

In particular, said actuation means may be controlled by a control system configured to give or not give consent to the opening of the door according to the activities taking place inside the cabin 1. For example, for safety reasons, the opening of the door can be conditioned to the stop of a machine tool arranged inside the confinement cabin 1.

According to embodiments not shown in the accompanying Figures, the confinement cabin 1 may not be provided with actuation means, since the opening and closing of the door 10, 100 is left to the intervention of an operator, who can act directly on the panel or on the movable arm.

More in detail, the actuation means 31, 32 or 31, 33, 34 are suitable to at least impose on the aforesaid at least one movable arm 11a, 11b a rotational motion around the hinging axis Y1 in both directions of rotation.

Operatively, as will be clarified in the following in the description, in some embodiments the aforesaid actuation means can be limited to putting only the movable arm in rotation, while in other embodiments they must also impose a rotational motion on the first pulley.

In accordance with a first preferred embodiment, shown in FIGS. 4 to 16, the aforesaid first pulley 21 is rotationally fixed and is integral with the load-bearing structure 2. As already mentioned, the second pulley 22 is instead coaxial with the tilting axis Y2 and is integral with the panel 12. The elastic transmission system constrains the movement of the second pulley 22 to the first pulley 21.

Figure 6:
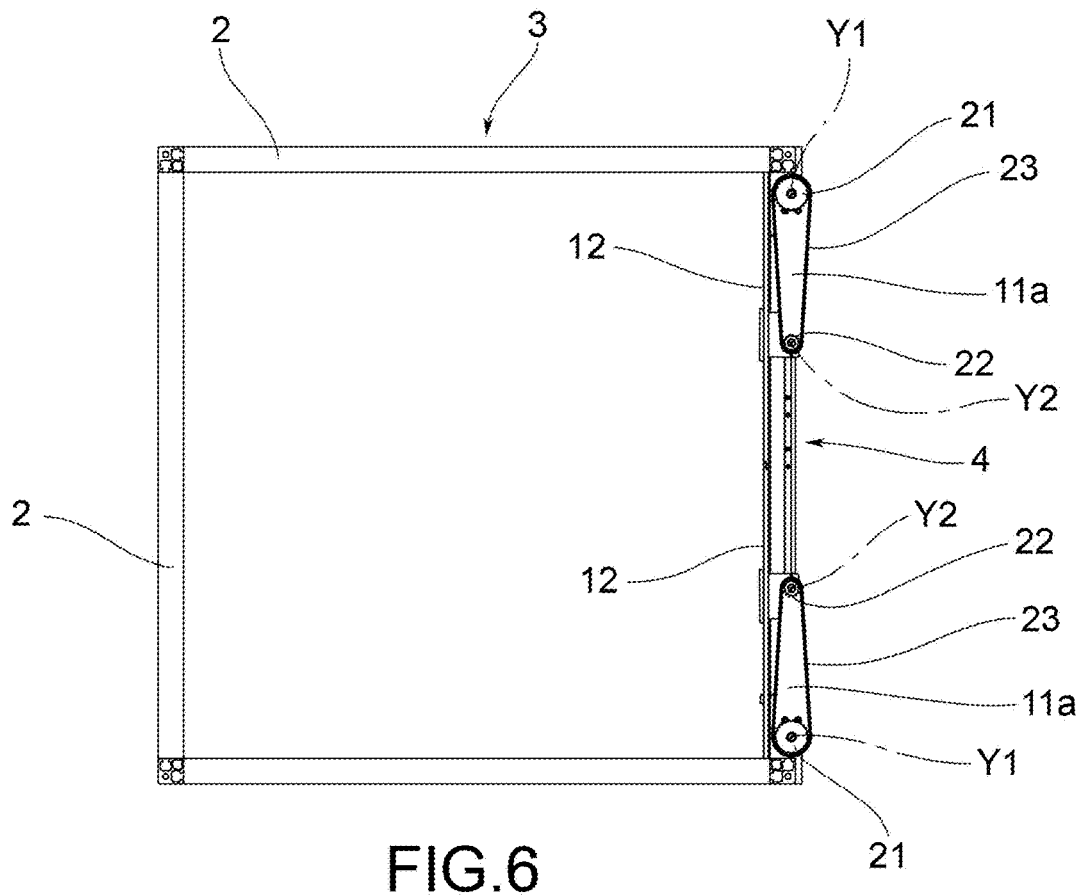
FIGS. 6 and 7 show two orthogonal views respectively from below and from above of the cabin of FIG. 4.
Figure 7:
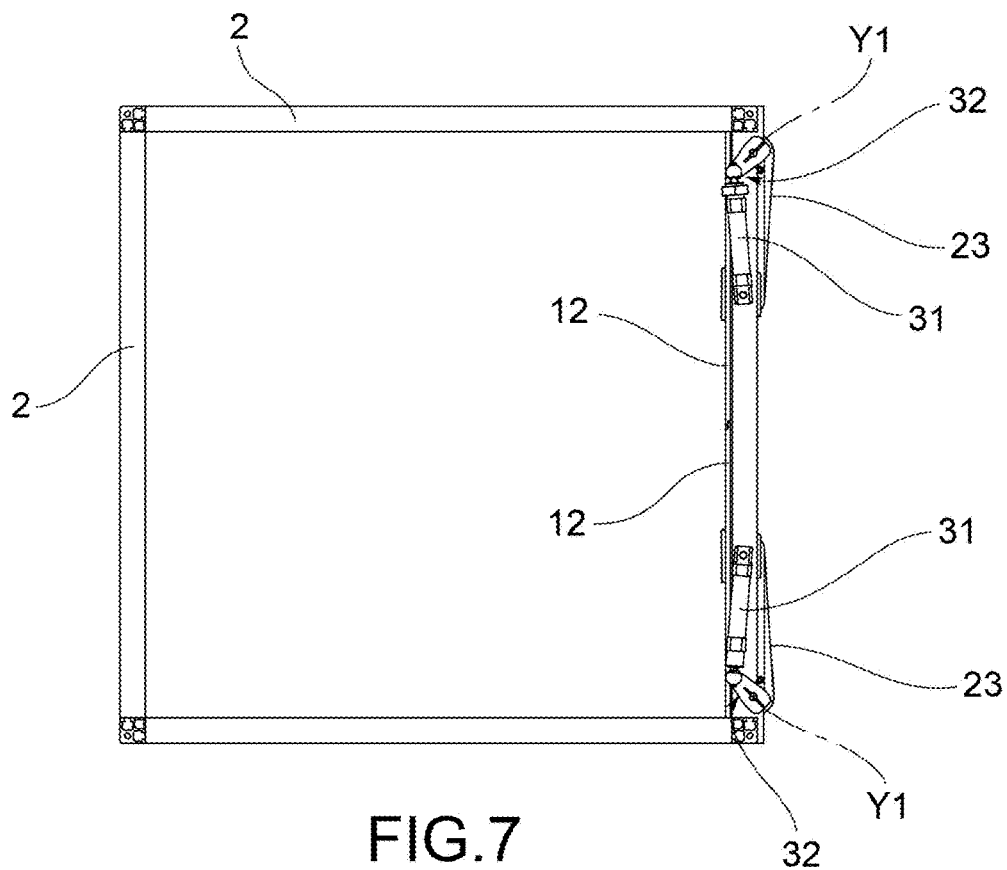
Figure 11:
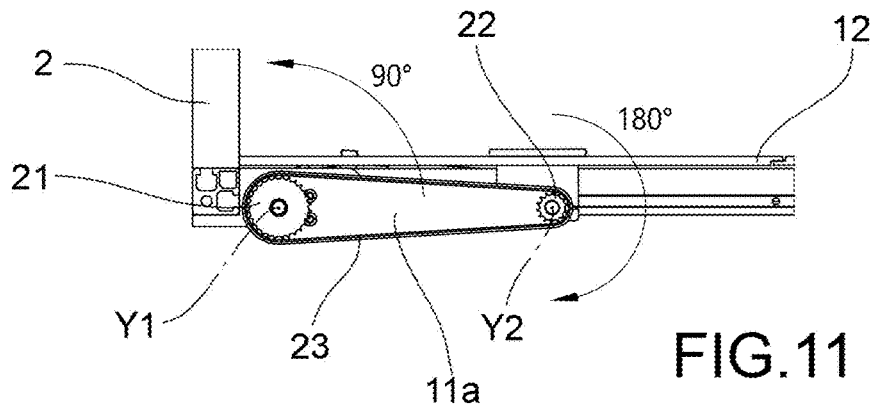
Figure 12:
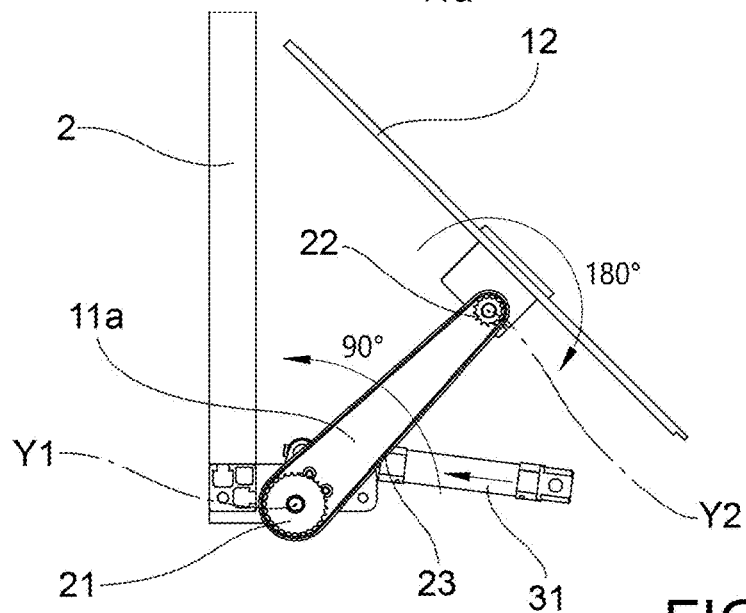

Operatively, as shown in particular in FIGS. 11, 12 and 13, the second pulley 22 follows the movable arm 11a, 11b in rotation. Following the rotation of the movable arm around the hinging axis Y1, the elastic transmission system 23 (consisting in particular of a toothed belt), while not sliding with respect to the first pulley, changes however orientation thereof with respect to the first pulley 21 (rotationally fixed). As a consequence of said change in orientation, the portion of the transmission system 23 in contact with the first pulley 21 changes as well. Since the distance between the two pulleys 21 and 22 is fixed by the length of the movable arm, the second pulley 22 is forced to rotate around the tilting axis Y2, with an opposite direction to that of the rotation of the movable arm around the hinging axis Y1.

As a result, a rotation of the movable arm around the hinging axis Y1 according to a rotation direction corresponds to a rotation in the opposite direction of the second pulley 22 (and therefore of the panel 12 integral therewith) around the tilting axis Y2.

The amplitude of the rotation around the tilting axis with respect to the amplitude of rotation around the hinging axis Y1 is fixed by the transmission ratio between the two pulleys 21 and 22.

Preferably, in order to reduce the maneuvering spaces required by the door in opening and closing, the amplitude of the rotation around the tilting axis Y2 is greater than the amplitude of the rotation around the hinging axis Y1. Therefore, preferably, the transmission ratio between the first pulley 21 and the second pulley 22 is greater than 1.

If (as shown in the accompanying figures) the maneuvering space of the door 10, 100 is limited to a 90° angle, a maximum rotation of 180° of the panel 12 around the tilting axis Y2 must correspond to a maximum rotation of 90° of the movable arm around the hinging axis Y1. In this case, the transmission ratio between the first pulley 21 and the second pulley 22 is preferably 2.

Advantageously, the transmission ratio may be chosen according to the specific sizing requirements of the cabin and of the relative door 10, 100.

Advantageously, in the specific case the rotation of the panel 12 around the tilting axis Y2 is caused directly by the rotation of the movable arm around the hinging axis Y1. In this case, the aforesaid actuation means 31, 32 can be suitable to impose only a rotational motion on said at least one movable arm 11a, 11b around the hinging axis Y1 in both directions of rotation.

Advantageously, as shown in FIGS. 11-16, the actuation means may comprise a linear actuator, such as a pneumatic cylinder 31, associated with the load-bearing structure 2 and kinematically connected to the aforesaid at least one movable arm 11a, 11b by a leverage 32. Operatively, the aforesaid leverage 32 transforms the linear movements of the pneumatic cylinder 31 into rotational movements of the movable arm around the hinging axis Y1.

In particular, the aforementioned pneumatic cylinder with leverage can act as a door locking device as well, both in the closed position and in the open position.

In accordance with alternative embodiments not shown in the accompanying figures, the actuation means may comprise any type of linear or rotary actuator, as long as it is configured to impose rotational movements on the movable arm around the hinging axis Y1.

In accordance with a second preferred embodiment, shown in FIGS. 17 to 29, the aforesaid first pulley 21 is kinematically connected to the aforesaid at least one movable arm 11a, 11b so as to rotate around said hinging axis Y1 always in the opposite direction with respect to said at least one movable arm 11a, 11b.

As already mentioned, the second pulley 22 is coaxial with the tilting axis Y2 and is integral with the panel 12. In this case, since the first pulley 21 is rotationally movable, the elastic transmission system 23 transmits the rotational movement of the first pulley to the second pulley 22.

Figure 24:
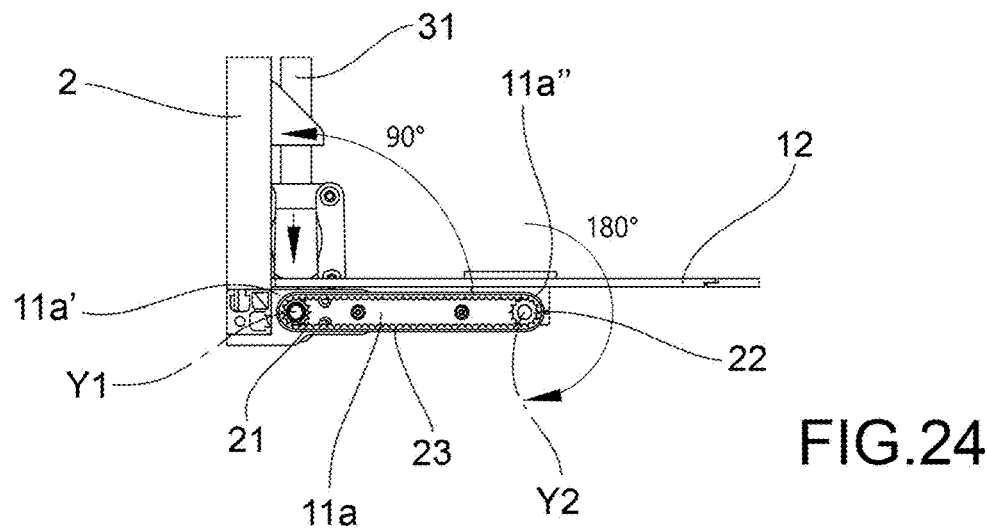
Figure 25:
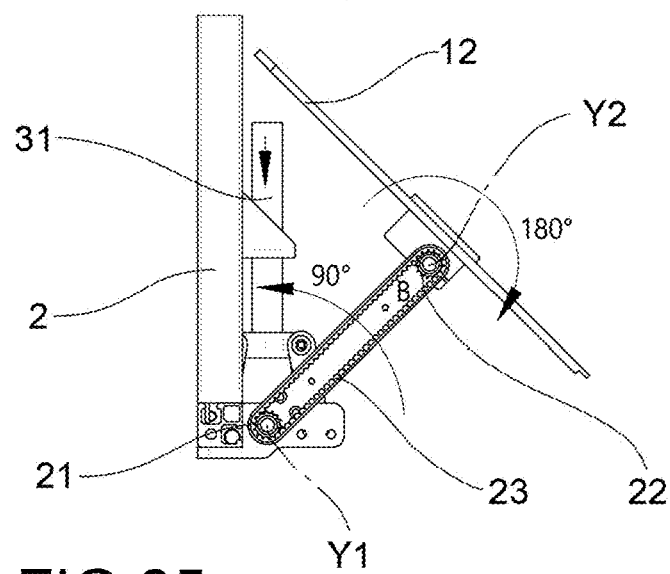

Operatively, as shown in particular in FIGS. 24, 25 and 26, the second pulley 22 follows the movable arm 11a, 11b in rotation. While the movable arm rotates around the hinging axis Y1, the first pulley 21 also rotates around the same axis but in the opposite direction. Therefore, with respect to the movable arm, the first pulley 21 undergoes a total rotation around the hinging axis Y1 which is given by the sum of the rotation of the movable arm and the own rotation.

The total rotation of the first pulley 21 is then transferred to the second pulley 22 by the transmission system 23, which in particular can comprise a toothed belt. The amplitude of the rotation of the second pulley 22 (and therefore of the panel 12 integral therewith) around the tilting axis Y2 with respect to the amplitude of the rotation of the first pulley 21 around the hinging axis Y1 is fixed by the transmission ratio between the two pulleys 21 and 22.

Preferably, in order to reduce the maneuvering spaces required by the door in opening and closing, the amplitude of the rotation around the tilting axis Y2 is greater than the amplitude of the rotation around the hinging axis Y1.

Considering that the total rotation of the first pulley 21 around the hinging axis Y1 is already greater than the rotation of the movable arm around the same axis, the transmission ratio between the first and second pulley could in some specific sizing cases even be lower than 1.

In order to minimize the maneuvering spaces required by the door in opening and closing, it is preferable not to limit the amplitude of the rotation around the tilting axis Y2. Therefore, preferably, the transmission ratio between the first pulley 21 and the second pulley 22 is not less than 1.

If (as shown in the accompanying figures) the maneuvering space of the door 10, 100 is limited to a 90° angle, a maximum rotation of 180° of the panel 12 around the tilting axis Y2 must correspond to a maximum rotation of 90° of the movable arm around the hinging axis Y1. Assuming that the own rotation of the first pulley 21 is 90°, the total rotation of the first pulley 21 is 180°. In this case, the transmission ratio between the first pulley 21 and the second pulley 22 is preferably 1.

Advantageously, the transmission ratio may in any case be chosen according to the specific sizing requirements of the cabin and of the relative door 10, 100.

In the specific case, the rotation of the panel 12 around the tilting axis Y2 is due to the simultaneous rotation of the movable arm and of the first pulley 21 around the hinging axis Y1. Advantageously, in this case, the aforesaid actuation means 31, 32 are suitable to not only impose a rotational motion on said at least one movable arm 11a, 11b around the hinging axis Y1 in both directions of rotation, but also a rotational motion around said hinging axis Y1 to said first pulley 21 in both directions of rotation.

Advantageously, as shown in FIGS. 24-29, the actuation means may comprise a linear actuator, such as a pneumatic cylinder 31, associated with the load-bearing structure 2 and kinematically connected:

to said at least one movable arm 11a, 11 b by a first leverage 33; and to the first pulley 21 by a second leverage 34.

The aforesaid two leverages 33, 34 are configured so that a linear motion of said pneumatic cylinder 31 generates on said at least one movable arm 11a, 11b and on said first pulley 21 two angular moments in opposite directions around said hinging axis Y1.

Advantageously, the two leverages 33 and 34 can be sized to generate equal angular moments in absolute value.

Operatively, the aforesaid two leverages 33 and 34 transform the linear movements of the pneumatic cylinder 31 into opposite rotational movements (and possibly equal in amplitude) of the movable arm and of the first pulley 21 around the hinging axis Y1.

In particular, the aforesaid pneumatic cylinder with double leverage can act as a door locking device as well, both in the closed position and in the open position.

In accordance with alternative embodiments not shown in the accompanying figures, the actuation means may comprise any type of linear or rotary actuator, as long as it is configured to impose rotational movements on the movable arm and on the first pulley around the hinging axis Y1.

In accordance with an embodiment not shown in the accompanying figures, the aforesaid actuation means may comprise:

a first actuator device suitable to impose a rotational motion around the hinging axis Y1 on said at least one movable arm in both directions of rotation; and a second actuator device suitable to impose a rotational motion around the hinging axis Y1 on said first pulley 21 (rotationally movable) in both directions of rotation.

The actuation of said two actuator devices is regulated according to one or more predefined laws of synchronization of rotation of said panel 12 around the tilting axis Y2 with rotation of the movable arm around the hinging axis Y1 by means of a control unit connected to said two actuator devices. This allows varying the synchronization laws of the panel tilting with the rotation of the movable arm according to specific needs.

The first embodiment (shown in FIGS. 4-16) is constructively simpler to obtain than the second embodiment (shown in FIGS. 17-29), but requires greater overall dimensions. In particular, in the first embodiment it may in fact be necessary to use a first pulley with a larger diameter than the second pulley. In some cases, this can create dimensional problems.

The present invention provides numerous advantages, some of which have already been pointed out previously.

The confinement cabin for working operative areas is provided with closing doors, which require limited maneuvering space in opening and closing and at the same time are not subject to the limits associated with the presence of sliding guides.

Due to the fact that the pivoting-tilting door (double or single) with which it is provided can abut against a sealing gasket, the confinement cabin 1 according to the present invention provides complete shielding of the working operative area also at the door, avoiding the accidental entry or exit of substances and/or materials from and into the inner space. Therefore, the cabin 1 provides complete protection to operators present in the environment near the cabin or greater protection of the inner operative area.

The confinement cabin for working operative areas is simple and inexpensive to realize, since the construction of the pivoting-tilting door (double or single) with which it is provided does not require use of expensive components.

Therefore, the invention thus conceived achieves the intended purposes.

Obviously, in the practical embodiment thereof, it may also take shapes and configurations different from the ones shown above, without thereby departing from the scope of protection as described and claimed herein.

Moreover, all details may be replaced by technically equivalent elements, and any size, shape and material may be used according to the needs.

What is claimed is:

1. A confinement cabin for working operative areas, comprising:
   a load-bearing structure;
   one or more confinement walls connected to said load-bearing structure to delimit at least partially an inner space of said confinement cabin; and
   an access opening to said inner space;
   at least one door connected to said load-bearing structure to close said access opening,
   wherein said at least one door is movable in opening and closing with a pivoting-tilting type movement and comprises:
      at least one movable support arm which at a first end is rotationally connected to said load-bearing structure to rotate around a hinging axis (Y1); and
      a closing panel rotationally connected to a second end of said at least one movable support arm to rotate around a tilting axis (Y2) parallel to the hinging axis (Y1),
   wherein rotation of the closing panel around the tilting axis (Y2) is synchronized with rotation of said at least one movable support arm around the hinging axis (Y1) by an elastic transmission system between a first pulley coaxial to the hinging axis (Y1) and a second pulley coaxial to the tilting axis (Y2) and integral with the closing panel, said elastic transmission system being configured in such a way that rotation of the closing panel around the tilting axis (Y2) is in an opposite direction to rotation of said at least one movable support arm around the hinging axis (Y1).

2. The confinement cabin of claim 1, comprising two doors that cooperate to close said access opening and are connected to said load-bearing structure with respective hinging axes (Y1) arranged in opposite positions with respect to a vertical, centerline axis of said access opening.

3. The confinement cabin of claim 1, wherein said elastic transmission system comprises a toothed belt and wherein said first pulley and second pulley are both toothed pulleys.

4. The confinement cabin of claim 1, wherein said closing panel is movable between:
- a closed position of said at least one door, wherein said closing panel is placed at said access opening, and
- an open position of said at least one door, wherein said closing panel is moved away from said access opening, and wherein in said closed position said at least one movable support arm is arranged outside said inner space of said confinement cabin.

5. The confinement cabin of claim 4, wherein in a movement between said closed position and said open position said closing panel is kept completely inside said confinement cabin without protruding outside.

6. The confinement cabin of claim 4, wherein in said open position said at least one movable support arm is placed between said load-bearing structure and said closing panel.

7. The confinement cabin of claim 1, wherein said at least one door comprises two movable support arms, which, at different vertical heights one from the other, are both rotationally connected to said load-bearing structure around said hinging axis (Y1) at respective first ends thereof and are rotationally connected to said closing panel around said tilting axis (Y2) at respective second ends thereof.

8. The confinement cabin of claim 7, wherein said two movable support arms are rigidly connected one to each other by a first elongated element and by a second elongated element, which is coaxial to said tilting axis (Y2) and acts as a pin of tilting for said closing panel and wherein said two movable support arms and said first and second elongated elements form a movable support frame for said closing panel.

9. The confinement cabin of claim 1, wherein said closing panel is movable by said at least one movable support arm.

10. The confinement cabin of claim 1, comprising actuation means of said at least one door on opening and closing, suitable at least for imposing a rotational motion around said hinging axis (Y1) on said at least one movable support arm in both directions of rotation.

11. The confinement cabin of claim 10, wherein said first pulley is rotationally fixed and is integral with said load-bearing structure, and wherein said actuation means are suitable for imposing only one rotational motion on said at least one movable support arm around said hinging axis (Y1) in both directions of rotation.

12. The confinement cabin of claim 11, wherein said actuation means comprise a pneumatic cylinder associated with said load-bearing structure and kinematically connected to said at least one movable support arm by a leverage.

13. The confinement cabin of claim 10, wherein said first pulley is kinematically connected to said at least one movable support arm to rotate around said hinging axis (Y1) always in the opposite direction to said at least one movable support arm, and wherein said actuation means are suitable for imposing also a rotational motion around said hinging axis (Y1) on said first pulley in both directions of rotation.

14. The confinement cabin of claim 13, wherein said actuation means comprise a pneumatic cylinder kinematically connected to said at least one movable support arm by a first leverage and to said first pulley by a second leverage, said first and second leverages being configured in such a way that a linear motion of said pneumatic cylinder generates on said at least one movable support arm and on said first pulley two angular moments in opposite directions around said hinging axis (Y1).

15. The confinement cabin of claim 13, wherein said actuation means comprise:
- a first actuator device suitable for imposing rotational motion around said hinging axis (Y1) on said at least one movable support arm in both directions of rotation; and
- a second actuator device suitable for imposing rotational motion around said hinging axis (Y1) on said first pulley in both directions of rotation, wherein actuation of said first and second actuator devices is regulated according to one or more predefined laws of synchronization of the rotation of said closing panel around the tilting axis (Y2) with the rotation of the movable arm around the hinging axis (Y1) by a control unit connected to said first and second actuator devices.

16. The confinement cabin of claim 1, wherein said first pulley is rotationally fixed and is integral with said load-bearing structure.

17. The confinement cabin of claim 16, wherein transmission ratio between the first pulley and the second pulley is greater than 1.

18. The confinement cabin of claim 17, wherein transmission ratio between the first pulley and the second pulley is equal to 2.

19. The confinement cabin of claim 1, wherein said first pulley is kinematically connected to said at least one movable support arm to rotate around said hinging axis (Y1) always in the opposite direction to said at least one movable support arm.

20. The confinement cabin of claim 19, wherein transmission ratio between the first pulley and the second pulley is not less than 1.

21. The confinement cabin of claim 20, wherein transmission ratio between the first pulley and the second pulley is equal to 1.

* * * * *